(12) United States Patent
Kawakami

(10) Patent No.: US 10,269,194 B2
(45) Date of Patent: Apr. 23, 2019

(54) MULTIPROCESSOR SYSTEM AND VEHICLE CONTROL SYSTEM

(71) Applicant: Renesas Electronics Corporation, Tokyo (JP)

(72) Inventor: Naotaka Kawakami, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/643,305

(22) Filed: Jul. 6, 2017

(65) Prior Publication Data

US 2018/0068501 A1    Mar. 8, 2018

(30) Foreign Application Priority Data

Sep. 8, 2016  (JP) .................. 2016-175474

(51) Int. Cl.
*G07C 5/08* (2006.01)
*G06F 11/30* (2006.01)
*G06F 13/40* (2006.01)
*G06F 13/42* (2006.01)
*G06F 11/34* (2006.01)

(52) U.S. Cl.
CPC ........ *G07C 5/0841* (2013.01); *G06F 11/3027* (2013.01); *G06F 11/3051* (2013.01); *G06F 13/4022* (2013.01); *G06F 13/4282* (2013.01); *G06F 11/349* (2013.01)

(58) Field of Classification Search
CPC .............. G07C 5/0841; G06F 11/3027; G06F 11/3051; G06F 13/4022; G06F 13/4282; G06F 11/349

USPC ........................................ 701/32.7
See application file for complete search history.

(56) References Cited

U.S. PATENT DOCUMENTS

2007/0033511 A1*   2/2007   Davies ............... G06F 11/1675
                                                              714/799
2015/0234760 A1    8/2015   Kimura

FOREIGN PATENT DOCUMENTS

JP          2015-153282 A      8/2015

* cited by examiner

*Primary Examiner* — Marthe Y Marc-Coleman
(74) *Attorney, Agent, or Firm* — McGinn I. P. Law Group, PLLC.

(57) ABSTRACT

It is possible to achieve monitoring of a processor element while suppressing the cost. A multiprocessor system 1 includes a bus mechanism including a storage unit 6 configured to store bus access information when a first processor element 2 has executed a process to be monitored, a requesting unit 7 configured to request a second processor element 3 to execute a monitoring process after the first processor element 2 has completed the execution of the process to be monitored, and a comparing unit 8 configured to compare bus access information regarding access of the first processor element 2 stored in the storage unit 6 with bus access information input from the second processor element 3 when the second processor element 3 has executed the monitoring process. The second processor element 3 executes the monitoring process in an idle time.

20 Claims, 12 Drawing Sheets

Fig. 3

MULTIPROCESSOR SYSTEM AND VEHICLE CONTROL SYSTEM

CROSS-REFERENCE TO RELATED APPLICATIONS

This application is based upon and claims the benefit of priority from Japanese patent application No. 2016-175474, filed on Sep. 8, 2016, the disclosure of which is incorporated herein in its entirety by reference.

BACKGROUND

The present invention relates to a multiprocessor system and a vehicle control system and relates to, for example, a multiprocessor system and a vehicle control system configured to perform monitoring using a bus mechanism.

In recent years, in the automobile market etc., it has been required to satisfy both enhancement of performance by multicore processing and the like and fail-safety techniques such as Dual Lock Step (DLS) or ternary majority rule (TMR). Various techniques therefor have been suggested.

For example, Japanese Unexamined Patent Application Publication No. 2015-153282 discloses a multiprocessor system that achieves functional safety thereof without closely coupling processor elements. In this multiprocessor system, a bus mechanism holds and compares bus access requests of a plurality of processor elements and detects an abnormality of the processor elements.

SUMMARY

However, according to the configuration for functional safety disclosed in Japanese Unexamined Patent Application Publication No. 2015-153282, two processor elements need to execute the same processing in order to achieve the DLS and three processor elements need to execute the same processing in order to achieve the TMR. That is, in order to achieve functional safety, besides the processor elements to be monitored, a processor element dedicated for monitoring needs to be prepared. That is, at least one processor element dedicated for monitoring that executes a program the same as the program executed by the processor element to be monitored needs to be prepared. This causes an increase in cost.

The other problems of the related art and the novel characteristics of the present invention will be made apparent from the descriptions of the specification and the accompanying drawings.

According to one embodiment, a multiprocessor system includes a bus mechanism including a storage unit configured to store bus access information when a first processor element has executed a process to be monitored, a requesting unit configured to request a second processor element to execute a monitoring process after the first processor element has completed the execution of the process to be monitored, and a comparing unit configured to compare bus access information regarding access of the first processor element stored in the storage unit with bus access information input from the second processor element when the second processor element has executed the monitoring process. The second processor element executes the monitoring process in an idle time.

According to the embodiment, it is possible to achieve monitoring of a processor element while suppressing the cost.

BRIEF DESCRIPTION OF THE DRAWINGS

The above and other aspects, advantages and features will be more apparent from the following description of certain embodiments taken in conjunction with the accompanying drawings, in which:

FIG. 3 is a schematic view showing an example in which data is stored in a storage area;

DETAILED DESCRIPTION

For the clarification of the description, the following description and the drawings may be omitted or simplified as appropriate. Throughout the drawings, the same components are denoted by the same reference symbols and overlapping descriptions will be omitted as appropriate.

<Outline of Embodiments>

Figure 1:
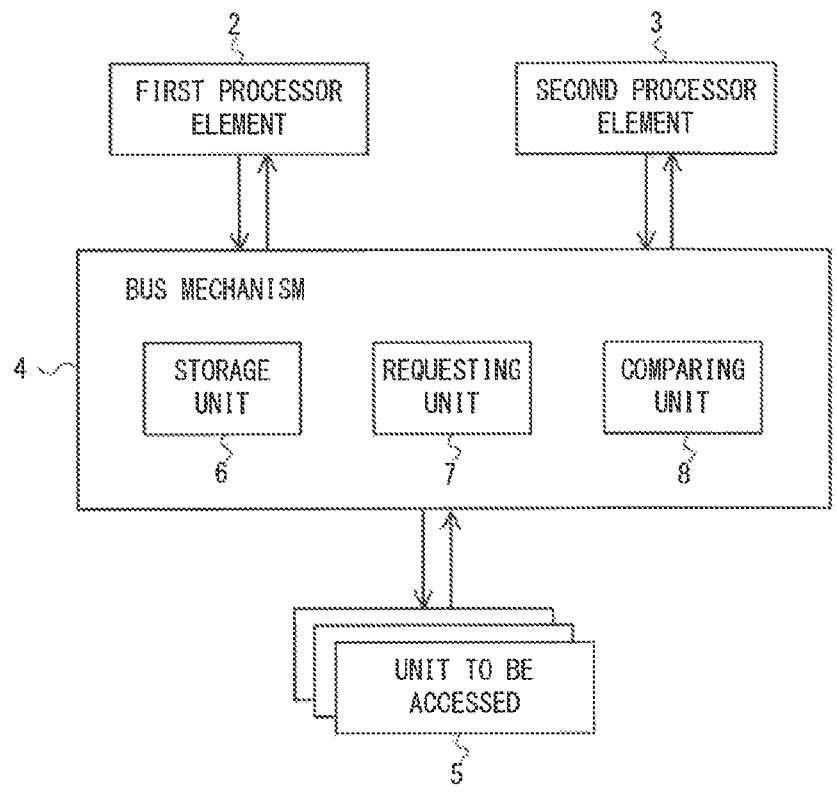
FIG. 1 is a block diagram showing one example of a configuration of a multiprocessor system according to an outline of embodiments.

Prior to giving a description of details of embodiments, an outline of the embodiments will be given first. FIG. 1 is a block diagram showing one example of a configuration of a multiprocessor system 1 according to the outline of the embodiments. The multiprocessor system 1 includes a first processor element 2, a second processor element 3, a bus mechanism 4, and a unit to be accessed 5.

The first processor element 2 is a processor element whose operations are monitored. The second processor element 3 executes a process whose processing content is the same as that of the process of the target to be monitored executed by the first processor element 2 (hereinafter this process will be called a monitoring process). In the following description, the process of the target to be monitored will be called a process to be monitored.

The unit to be accessed 5 is accessed by the first processor element when the first processor element 2 executes the process to be monitored.

The bus mechanism 4 is provided on an access path between the first processor element 2 and the unit to be accessed 5 and controls access to the unit to be accessed 5. The bus mechanism 4 includes, as shown in FIG. 1, a storage unit 6, a requesting unit 7, and a comparing unit 8.

The storage unit 6 stores bus access information regarding the access to the unit to be accessed 5 that occurs when the first processor element 2 executes the process to be monitored. The bus access information stored in the storage unit 6 includes, for example, access destination information for a read access and read data and access destination information for a write access and write data.

The requesting unit 7 requests the second processor element 3 to execute a monitoring process after the first processor element 2 has completed the execution of the process to be monitored. The second processor element 3 executes the monitoring process after it receives the request from the requesting unit 7. The second processor element 3 executes the monitoring process in an idle time after it receives the request from the requesting unit 7. The second processor element 3 executes the monitoring process in, for example, a time zone during which a predetermined processing other than the execution of the monitoring process is not performed. This predetermined processing may be processing whose priority is higher than that of the execution of the monitoring process. The second processor element 3 executes the monitoring process in the time zone during which the predetermined processing is not performed, whereby it is possible to prevent the execution of the predetermined processing from being interrupted.

The comparing unit 8 compares the bus access information regarding the access of the first processor element 2 stored in the storage unit 6 with the bus access information input to the bus mechanism 4 from the second processor element when the second processor element 3 has executed the monitoring process. When both the above former and latter bus access information coincide with each other, this means that the operation of the first processor element 2 is normal. On the other hand, when both the above former and latter bus access information do not coincide with each other, this means that the operation of the first processor element 2 is abnormal. It is therefore possible to monitor the operations of the first processor element 2 by the comparison processing by the comparing unit 8.

According to the multiprocessor system 1, as described above, the requesting unit 7 requests, after the first processor element 2 has completed the execution of the process to be monitored, the second processor element 3 to execute the monitoring process. The second processor element 3 then executes the monitoring process at its own idle time. Therefore, the second processor element 3 is able to execute the process other than the execution of the monitoring process. In other words, the second processor element 3 may not be a processor element dedicated for monitoring the first processor element 2. Accordingly, in the multiprocessor system 1, it is possible to achieve monitoring of the processor element while suppressing cost.

While the processor element whose operations are monitored is the first processor element 2 in the aforementioned description, the operations of the second processor element 3 may be monitored as well. In this case, the first processor element 2 executes the monitoring process whose processing content is the same as that of the process to be monitored executed by the second processor element 3. Further, in this case, when the second processor element 3 executes the process to be monitored, the unit to be accessed 5 is also accessed by the second processor element. In this way, the monitoring operations may be mutually performed.

<Details of Embodiments>
<First Embodiment>

Figure 2:
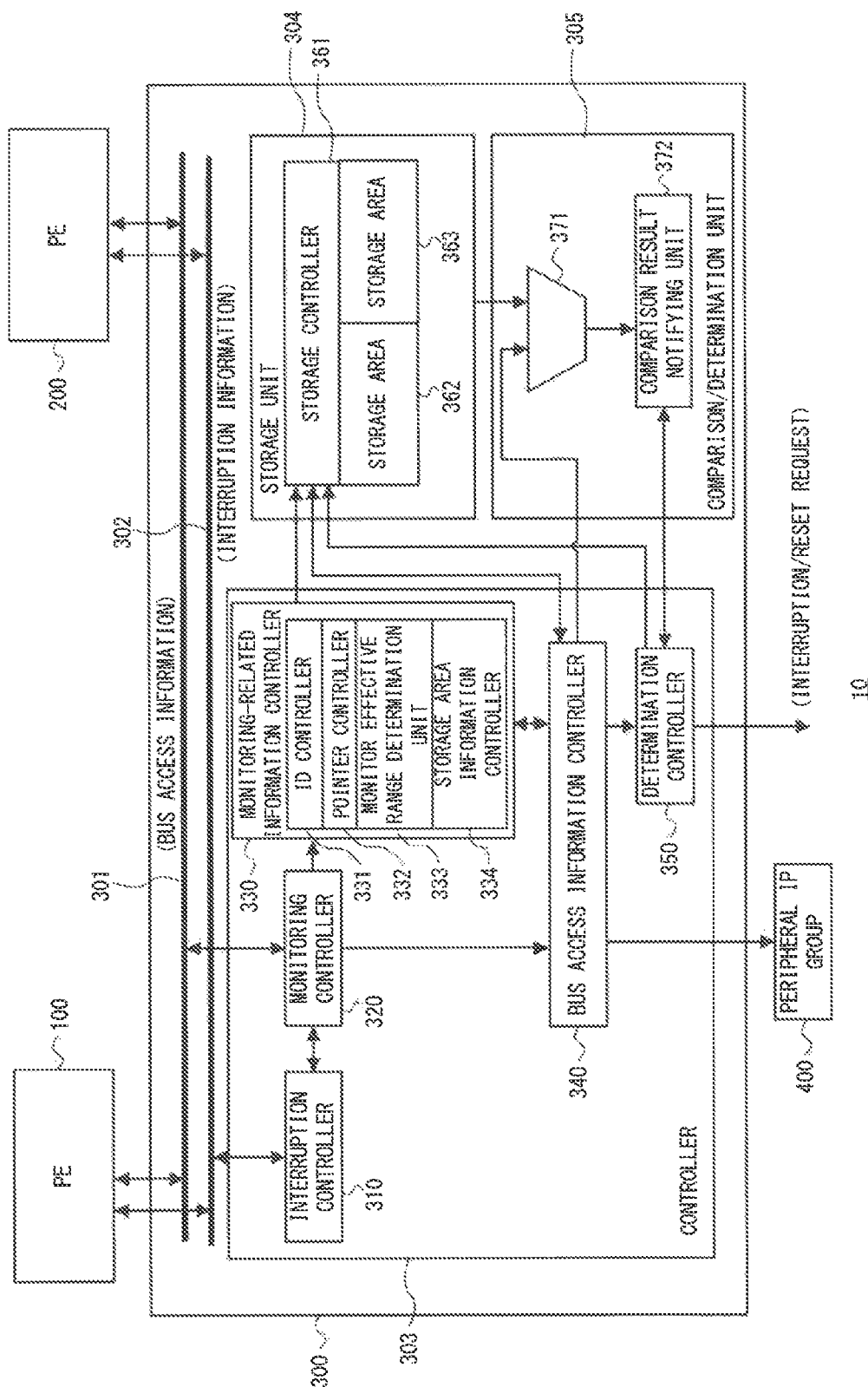
FIG. 2 is a block diagram showing one example of a detailed configuration of a multiprocessor system according to a first embodiment.

Next, details of the embodiments will be described. FIG. 2 is a block diagram showing one example of a detailed configuration of the multiprocessor system 10 according to the first embodiment. As shown in FIG. 2, the multiprocessor system 10 includes PEs 100 and 200, a bus mechanism 300, and peripheral IP (intellectual property) group 400.

The PEs 100 and 200 are processor elements corresponding to the aforementioned first processor element 2 and second processor element 3. The PEs 100 and 200 are called processor cores or the like and are circuits capable of executing a program and performing data processing. In this embodiment, the PEs 100 and 200 periodically execute a predetermined process in order to periodically achieve predetermined processing. The PEs 100 and 200 complete, for example, execution of the predetermined process within a period of T. The PEs 100 and 200 complete execution of the predetermined process within the period of T in the next cycle as well. The PEs 100 and 200 repeat this operation. If it is assumed that the PEs 100 and 200 are able to complete the execution of the predetermined process at time t1 in each cycle, time t2 (=T−t1) in the period T becomes an idle time. That is, the idle time means a time zone during which a predetermined process is not executed in the period during which the predetermined process and the monitoring process in the PEs 100 and 200 are executed. The PEs 100 and 200 execute the monitoring process to monitor each other at this idle time t2. That is, the PEs 100 and 200 periodically execute the predetermined process and the monitoring process.

More specifically, the PEs 100 and 200 execute one of the process to be monitored, the monitoring process, and a process (this process is called a normal processes) which is neither the process to be monitored nor the monitoring process. The aforementioned predetermined process includes the process to be monitored and the normal process. However, when all the predetermined processes are the targets to be monitored, the predetermined process does not include the normal process. The monitoring process is a process executed by one PE in order to monitor the process to be monitored executed by another PE and is a process whose processing content is the same as that of the process to be monitored.

The PEs 100 and 200 notify, when the execution of the process to be monitored is started and it is ended and when the execution of the monitoring process is started and it is ended, the bus mechanism 300 that the execution of the process has been started/ended via the bus 301. The bus mechanism 300 executes, when it receives the notification indicating that the execution of the process to be monitored should be started, the processing by each structure of the bus mechanism 300 corresponding to the aforementioned storage unit 6, requesting unit 7, and comparing unit 8. Accordingly, the bus mechanism 300 does not need to perform the monitoring processing for all the processes executed by the PEs 100 and 200, whereby it is possible to reduce the amount of processing. Further, the PEs 100 and 200 notify, when the execution of the interruption processing is started and it is ended, the bus mechanism 300 that the execution of the processing has been started/ended via the bus 302. In this description, the notification sent when the execution of the process to be monitored is started may be called a monitoring target process start notification and the notification sent when the execution of the process to be monitored is ended may be called a monitoring target process end notification. Further, in this description, the notification sent when the execution of the monitoring process is started may be called a monitoring process start notification and the notification sent when the execution of the monitoring process is ended may be called a monitoring process end notification. Further, in this description, the notification sent when the execution of the interruption processing is started may be called an interruption occurrence notification and the notification sent when the execution of the interruption processing is ended may be called an interruption end notification.

The monitoring target process start notification, the monitoring target process end notification, the monitoring process start notification, and the monitoring process end notification are input to a monitoring controller 320 (described later) of the bus mechanism 300. Further, the interruption occurrence notification and the interruption end notification are input to an interruption controller 310 (described later) of the bus mechanism 300.

Further, the PEs 100 and 200 notify the bus mechanism 300 of monitor effective range information via the bus 301 when the execution of the process to be monitored is started. The monitor effective range information means information indicating an access range to be monitored. When there is no need to monitor all the access ranges that may occur for the peripheral IP group 400, the PEs 100 and 200 notify the bus mechanism 300 of the access range to be monitored by sending the monitor effective range information. Accordingly, instead of performing monitoring processing for all the accesses that occur in association with the execution of the monitoring process, the bus mechanism may perform monitoring processing for only the access that needs to be monitored. It is therefore possible to reduce the amount of processing of the bus mechanism 300.

Furthermore, the PEs 100 and 200 notify, when the execution of the process to be monitored is started, the bus mechanism 300 of storage area information via the bus 301. The storage area information is information indicating a storage capacity that is necessary for the storage of the bus access information generated by the access included in the monitor effective range among the accesses that occur due to the execution of the process to be monitored.

The monitor effective range information and the storage area information are also input to the monitoring controller 320 (described later) of the bus mechanism 300.

The peripheral IP group 400 corresponds to the aforementioned unit to be accessed 5 and is a circuit accessed by the PEs 100 and 200. While the peripheral IP group 400 includes, for example, but not limited to, a storage device such as a memory, an AD converter, and a timer circuit, the peripheral IP group 400 may include any circuit to be a target of the read access or the write access by the PEs 100 and 200. Further, the peripheral IP group 400 may not necessarily include a plurality of units to be accessed and may include only one unit to be accessed. The peripheral IP group 400 is accessed by the PEs 100 and 200 via the bus mechanism 300.

The bus mechanism 300 corresponds to the aforementioned bus mechanism 4 and is provided on an access path between the PEs 100 and 200 and the peripheral IP group 400. The bus mechanism 300 controls access from the PEs 100 and 200 to the peripheral IP group 400. The bus mechanism 300 includes buses 301 and 302, a controller 303, a storage unit 304, and a comparison/determination unit 305.

The bus 301 is a transmission path to transmit the bus access information when the PEs 100 and 200 access the peripheral IP group 400. Further, the bus 302 is a transmission path to transmit interruption information regarding the interruption processing that has occurred in the PEs 100 and 200.

The controller 303 is a control circuit that performs control including control of access to the peripheral IP group 400 by the PEs 100 and 200 and monitoring control of the PEs 100 and 200. The storage unit 304 corresponds to the aforementioned storage unit 6 and is a storage device that stores the bus access information regarding the access to the peripheral IP group 400 that occurs when the PEs 100 and 200 to be monitored has executed the process to be monitored. The comparison/determination unit 305 corresponds to the aforementioned comparing unit 8 and is a circuit that compares the bus access information when one of the PEs 100 and 200 has executed the process to be monitored with the bus access information when the other one of the PEs 100 and 200 has executed the monitoring process to determine whether or not there is an abnormality in the PEs 100 and 200. The detailed configurations of the controller 303, the storage unit 304, and the comparison/determination unit 305 will be described later.

Figure 3:
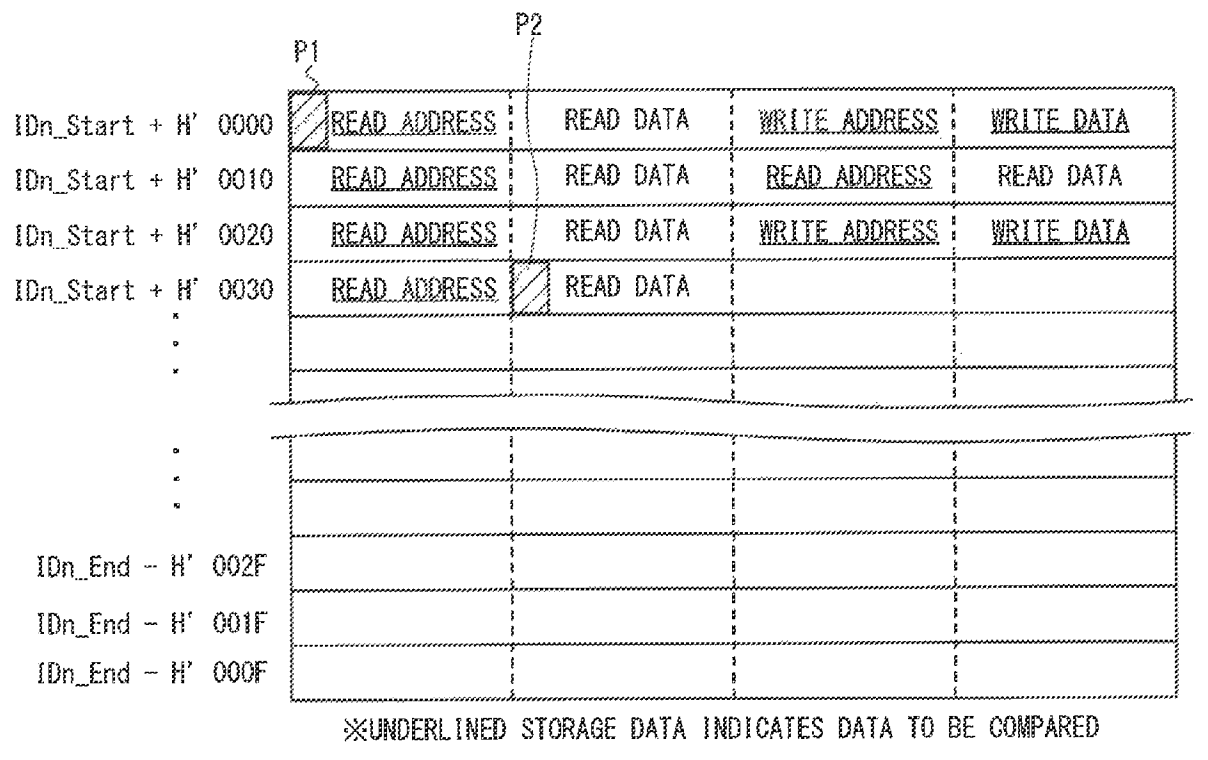

In order to facilitate understanding of the monitoring method according to this embodiment, with reference to FIG. 3, a specific example of the monitoring in this embodiment will be described. FIG. 3 is a schematic view showing an example of storing data in a storage area (described later) of the storage unit 304. In the following description, it is assumed that the PE 100 is the PE to be monitored (that is, the PE 100 is the PE that executes the process to be monitored) and the PE 200 is the PE that executes the monitoring process for monitoring the PE 100.

FIG. 3 specifically shows a storage area 362, which is a storage area that stores the bus access information when the process to be monitored is executed by the PE 100. In this embodiment, an ID is allocated for each process to be monitored. The storage area 362 reserves an area for each ID. In FIG. 3, IDn_Start is the top address of the area reserved for the process to be monitored in which the value of the ID is IDn (n=1, 2, 3, . . . ). Further, IDn_End is the final address of the area reserved for the process to be monitored in which the value of the ID is IDn. Further, P1 is a pointer indicating IDn_Start and P2 is a pointer indicating the storage location of the bus access information when the PE 100 executes the process to be monitored or a pointer indicating the reference destination of the bus access information when the PE 200 executes the monitoring process. The pointer P2 is a relative address with respect to the pointer P1 and is initialized to 0 when the PE 100 has completed the execution of the process to be monitored and when the PE 200 has completed the execution of the monitoring process.

As shown in FIG. 3, when the read access has occurred when the process to be monitored is executed by the PE 100, the read address and the read data are stored in the storage area 362 as the bus access information. In a similar way, when the write access has occurred when the process to be monitored is executed by the PE 100, the write address and the write data are stored in the storage area 362 as the bus access information.

Specifically, when the read access has occurred when the process to be monitored is executed by the PE 100, the bus mechanism 300 performs processing in the following procedure. First, the bus mechanism 300 stores the read address requested from the PE 100 in the storage location specified by the pointer P1 and the pointer P2. Next, the bus mechanism 300 updates the value of the pointer P2. That is, the bus mechanism 300 updates the pointer P2 by adding the address value corresponding to the amount of data of the read address data that has been stored. The address value corresponding to the amount of data of the read address data may be a predetermined value. Next, the bus mechanism 300 stores the read data acquired from the peripheral IP group 400 based on the read address in the storage location specified by the pointer P2 that has been updated. Then the bus mechanism 300 updates the value of the pointer P2. That is, the bus mechanism 300 updates the pointer P2 by adding the address value corresponding to the amount of data of the read data that has been stored. The address value corresponding to the amount of data of the read data may be a predetermined value. Then the bus mechanism 300 transmits the read data to the PE 100. The bus mechanism 300 performs the aforementioned processing every time the read access in association with the execution of the process to be monitored occurs.

Further, when the write access has occurred when the process to be monitored is executed by the PE 100, the bus mechanism 300 performs processing in the following procedure. First, the bus mechanism 300 stores the write address requested from the PE 100 in the storage location specified by the pointer P1 and the pointer P2. Next, the bus mechanism 300 updates the value of the pointer P2. That is, the bus mechanism 300 updates the pointer P2 by adding the address value corresponding to the amount of data of the write address data that has been stored. The address value corresponding to the amount of data of the write address data may be a predetermined value. Next, the bus mechanism 300 stores the write data requested from the PE 100 in the storage location specified by the pointer P2 that has been updated. Then the bus mechanism 300 updates the value of the pointer P2. That is, the bus mechanism 300 updates the pointer P2 by adding the address value corresponding to the amount of data of the write data that has been stored. The address value corresponding to the amount of data of the write data may be a predetermined value. The bus mechanism 300 writes the write data to the peripheral IP group 400 specified by the write address. The bus mechanism 300 performs the aforementioned processing every time the write access in association with the execution of the process to be monitored occurs.

When the execution of the process to be monitored by the PE 100 is all completed, the bus mechanism 300 requests the PE 200 to execute the monitoring process. When the access to the peripheral IP group 400 has occurred at the time of execution of the monitoring process by the PE 200, the bus mechanism 300 operates as follows.

When the read access has occurred when the monitoring process is executed by the PE 200, the bus mechanism 300 performs processing in the following procedure. First, the bus mechanism 300 compares the read address requested from the PE 200 with the read address stored in the storage location specified by the pointer P1 and the pointer P2. Next, the bus mechanism 300 updates the value of the pointer P2. That is, the bus mechanism 300 updates the pointer P2 by adding the address value corresponding to the amount of data of the read address data that is stored. Next, the bus mechanism 300 transmits the read data stored in the storage location specified by the pointer P1 and the pointer P2 to the PE 200. The bus mechanism 300 updates the value of the pointer P2. That is, the bus mechanism 300 updates the pointer P2 by adding the address value corresponding to the amount of data of the read data that is stored. The bus mechanism 300 performs the aforementioned processing every time the read access in association with the execution of the monitoring process occurs.

Further, when the write access has occurred at the time of execution of the monitoring process by the PE 200, the bus mechanism 300 performs processing in the following procedure. First, the bus mechanism 300 compares the write address requested from the PE 200 with the write address stored in the storage location specified by the pointer P1 and the pointer P2. Next, the bus mechanism 300 updates the value of the pointer P2. That is, the bus mechanism 300 updates the pointer P2 by adding the address value corresponding to the amount of data of the write address data that is stored. Next, the bus mechanism 300 compares the write data requested from the PE 200 with the write data stored in the storage location specified by the pointer P1 and the pointer P2. That is, the bus mechanism 300 updates the value of the pointer P2. That is, the bus mechanism 300 updates the pointer P2 by adding the address value corresponding to the amount of data of the write data that is stored. The bus mechanism 300 performs the aforementioned processing every time the write access in association with the execution of the monitoring process occurs.

As described above, the bus mechanism 300 checks only the read address regarding the read access in association with the execution of the process to be monitored and determines whether or not there is an abnormality in the PEs 100 and 200. Further, the bus mechanism 300 checks the write address and the write data regarding the write access in association with the execution of the process to be monitored and determines whether or not there is an abnormality in the PEs 100 and 200.

Next, a specific configuration example of the bus mechanism 300 will be described. In the following description, the PE which is a target to be monitored will be called a PE to be monitored and the PE that executes the monitoring process whose processing content is the same as that of the process to be monitored executed by the PE to be monitored in order to monitor the PE to be monitored is called a monitoring processing execution PE. While the PE 100 serves as a PE to be monitored and the PE 200 serves as a monitoring processing execution PE, the PE 200 may serve as a PE to be monitored and the PE 100 may serve as a monitoring processing execution PE.

<Controller 303>

As shown in FIG. 2, the controller 303 includes the interruption controller 310, the monitoring controller 320, a monitoring-related information controller 330, a bus access information controller 340, and a determination controller 350. Further, the monitoring-related information controller 330 includes an ID controller 331, a pointer controller 332, a monitor effective range determination unit 333, and a storage area information controller 334. In the following description, each component will be described.

<Interruption Controller 310>

The interruption controller 310 is a control circuit that requests the monitoring controller 320 to control the monitoring processing in accordance with the interruption that has occurred in the PEs 100 and 200. The interruption controller 310 specifically performs the following operations.

Upon receiving the interruption occurrence notification from the PEs 100 and 200, the interruption controller 310 requests the monitoring controller 320 to interrupt the monitoring processing that is being executed. Further, upon receiving the interruption end notification from the PEs 100 and 200, the interruption controller 310 requests the monitoring controller 320 to re-start the monitoring processing that has been interrupted.

<Monitoring Controller 320>

The monitoring controller 320 is a control circuit that controls the monitoring processing in the bus mechanism 300. The monitoring controller 320 specifically performs the following operations.

When the monitoring controller 320 receives the monitoring target process start notification from the PE to be monitored, the monitoring controller 320 requests the monitoring-related information controller 330 to configure the ID and the pointer. Further, the monitoring controller 320 outputs the monitor effective range information and the storage area information that have been received together with the monitoring target process start notification to the monitoring-related information controller 330. Further, when the monitoring controller 320 receives the monitoring target process start notification from the PE to be monitored, the monitoring controller 320 notifies the bus access information controller 340 that it has received the notification and then outputs the bus access information from the PE to be monitored to the bus access information controller 340 as the process to be monitored until it receives the monitoring target process end notification or it receives the request for interrupting the monitoring processing from the interruption controller 310.

When the monitoring controller 320 receives the monitoring target process end notification from the PE to be monitored, the monitoring controller 320 requests the monitoring processing execution PE to execute the monitoring process. That is, the monitoring controller 320 corresponds to the aforementioned requesting unit 7. Further, when the monitoring controller 320 receives the monitoring target process end notification from the PE to be monitored, the monitoring controller 320 notifies the bus access information controller 340 that it has received the notification and then outputs the bus access information from the PE to be monitored to the bus access information controller 340 as the normal process until it receives the monitoring target process start notification from the PE to be monitored.

When the monitoring controller 320 receives the monitoring process start notification from the monitoring processing execution PE, the monitoring controller 320 requests the bus access information controller 340 to prohibit the access to the peripheral IP group 400 from the monitoring processing execution PE. Further, when the monitoring controller 320 receives the monitoring process start notification from the monitoring processing execution PE, the monitoring controller 320 notifies the bus access information controller 340 that it has received the notification and then outputs the bus access information from the monitoring processing execution PE as the monitoring process to the bus access information controller 340.

When the monitoring controller 320 receives the monitoring process end notification from the monitoring processing execution PE, the monitoring controller 320 requests the bus access information controller 340 to allow the access to the peripheral IP group 400 from the monitoring processing execution PE. Further, when the monitoring controller 320 receives the monitoring process end notification from the monitoring processing execution PE, the monitoring controller 320 notifies the bus access information controller 340 that it has received the notification and then outputs the bus access information from the monitoring processing execution PE to the bus access information controller 340 as the normal process. Further, when the monitoring controller 320 receives the monitoring process end notification from the monitoring processing execution PE, the monitoring controller 320 requests the monitoring-related information controller 330 to reset the ID, reset the pointer, reset the monitor effective range information, and release the storage area that has been reserved.

When the monitoring controller 320 receives the interruption request from the interruption controller 310 while the process to be monitored is being executed, the monitoring controller 320 requests the monitoring-related information controller 330 to save the ID, the pointer, and the monitor effective range information.

When the monitoring controller 320 receives the interruption request from the interruption controller 310 while the monitoring process is being executed, the monitoring controller 320 requests the bus access information controller 340 to allow the access from the monitoring processing execution PE to the peripheral IP group 400.

When the monitoring controller 320 receives the request for re-starting the monitoring processing regarding the process to be monitored from the interruption controller 310, the monitoring controller 320 requests the monitoring-related information controller 330 to restore the ID, the pointer, and the monitor effective range information. When the monitoring controller 320 receives the re-starting request, the monitoring controller 320 notifies the bus access information controller 340 that it has received the re-starting request and then outputs the bus access information from the PE to be monitored to the bus access information controller 340 as the process to be monitored until it receives the monitoring target process end notification or it receives the request for interrupting from the interruption controller 310.

When the monitoring controller 320 receives the request for re-starting the monitoring processing regarding the monitoring process from the interruption controller 310, the monitoring controller 320 requests the bus access information controller 340 to prohibit the access to the peripheral IP group 400 from the monitoring processing execution PE. Further, when the monitoring controller 320 receives the re-start request sent from the interruption controller 310, the monitoring controller 320 notifies the bus access information controller 340 that it has received the re-start request and then outputs the bus access information from the monitoring processing execution PE to the bus access information controller 340 as the monitoring process.

<ID Controller 331>

The ID controller 331 is a control circuit that manages the ID allocated for each process to be monitored. The ID controller 331 specifically performs the following operations.

The ID controller 331 receives a request for setting the ID, a request for saving the ID, and a request for restoring the ID from the monitoring controller 320. When the ID controller 331 receives the request for setting the ID from the monitoring controller 320, the ID controller 331 allocates a specific ID to the process to be monitored. The ID controller 331 stores the allocated ID in a managing register (not shown) provided in the ID controller 331, which is a register for storing the ID to be currently executed. At the same time, the ID controller 331 requests the storage unit 304 to store the process to be monitored in association with the ID. Further, when the ID controller 331 receives the request for saving the ID from the monitoring controller 320, the ID controller 331 stores the ID stored in the managing register in a saving register (not shown) provided in the ID controller 331. Further, when the ID controller 331 receives the request for restoring the ID from the monitoring controller 320, the ID controller 331 restores the ID stored in the saving register in the managing register. Further, when the ID controller 331 receives the request for resetting the ID from the monitoring controller 320, the ID controller 331 resets the managing register.

<Pointer Controller 332>

The pointer controller 332 is a control circuit that manages the aforementioned pointers P1 and P2. The pointer controller 332 specifically performs the following operations.

The pointer controller 332 receives a request for setting the pointer, a request for saving the pointer, a request for restoring the pointer, and a request for resetting the pointer from the monitoring controller 320. When the pointer controller 332 receives the request for setting the pointer from the monitoring controller 320, the pointer controller 332 performs initial configuration of the aforementioned pointers P1 and P2. The pointer controller 332 requests the storage unit 304 to store the reference value of the pointer P1 that has been initially configured in association with the ID and stores the reference value of the pointer P2 that has been initially configured in a managing register (not shown) provided in the pointer controller 332. While the pointer P1 is stored in the storage unit 304 in this embodiment, the pointer P1 may be managed in a register or the like provided in the pointer controller 332, in a way similar to the pointer P2. Further, when the pointer controller 332 receives the request for saving the pointer from the monitoring controller 320, the pointer controller 332 stores the reference value of the pointer stored in the managing register in a saving register (not shown) provided in the pointer controller 332. Further, when the pointer controller 332 receives the request for restoring the pointer from the monitoring controller 320, the pointer controller 332 restores the reference value of the pointer stored in the saving register in the managing register. Further, when the pointer controller 332 receives the request for resetting the pointer from the monitoring controller 320, the pointer controller 332 resets the managing register. Further, when the pointer controller 332 receives the request for updating the pointer reference value from the bus access information controller 340, the pointer controller 332 updates the reference value of the pointer P2 stored in the managing register.

<Monitor Effective Range Determination Unit 333>

The monitor effective range determination unit 333 is a control circuit to configure the monitor effective range information. The monitor effective range determination unit 333 specifically performs the following operations.

The monitor effective range determination unit 333 receives the monitor effective range information from the monitoring controller. Further, the monitor effective range determination unit 333 receives a request for saving the monitor effective range information, a request for restoring the monitor effective range information, and a request for resetting the monitor effective range information from the monitoring controller. Upon receiving the monitor effective range information from the monitoring controller 320, the monitor effective range determination unit 333 stores the monitor effective range information in a managing register (not shown) provided in the monitor effective range determination unit 333. Further, upon receiving the request for saving the monitor effective range information from the monitoring controller 320, the monitor effective range determination unit 333 stores the monitor effective range information stored in the managing register in a saving register (not shown) provided in the monitor effective range determination unit 333. Further, upon receiving the request for restoring the monitor effective range information from the monitoring controller 320, the monitor effective range determination unit 333 restores the monitor effective range information stored in the saving register in the managing register. Further, upon receiving the request for resetting the monitor effective range information from the monitoring controller 320, the monitor effective range determination unit 333 resets the monitor effective range information corresponding to the ID set in the ID controller 331. Specifically, the monitor effective range determination unit 333 resets the managing register.

<Storage Area Information Controller 334>

The storage area information controller 334 is a control circuit that requests the storage unit 304 to reserve the storage area based on the storage area information. The storage area information controller 334 specifically performs the following operations.

The storage area information controller 334 receives the storage area information from the monitoring controller 320. Further, the storage area information controller 334 receives a signal for requesting for releasing the storage area from the monitoring controller 320. When the storage area information controller 334 receives the storage area information from the monitoring controller 320, the storage area information controller 334 requests a storage controller 361 of the storage unit 304 to reserve the area corresponding to the storage capacity indicated by the storage area information as the storage area for the PE to be monitored. Further, when the storage area information controller 334 receives the request for releasing the storage area from the monitoring controller 320, the storage area information controller 334 requests the storage controller 361 of the storage unit 304 to release the storage area for the PE to be monitored.

<Bus Access Information Controller 340>

The bus access information controller 340 is a control circuit that controls the bus access information from the PEs 100 and 200. The bus access information controller 340 specifically performs the following operations.

When the bus access information controller 340 has received the bus access information from the monitoring controller 320 as the bus access by the process to be monitored, the bus access information controller 340 checks the information set in the monitor effective range determination unit 333. The bus access information controller 340 determines whether the access destination indicated by the bus access information that has been received is within the monitor effective range. When the access destination is within the monitor effective range, the bus access information controller 340 requests the storage unit 304 to store the bus access information in the storage area corresponding to the ID set in the ID controller 331 and accesses the peripheral IP group 400 in accordance with the bus access information. When the access destination is outside the monitor effective range, the bus access information controller 340 does not request the storage unit 304 to store the bus access information and accesses the peripheral IP group 400.

When the bus access information controller 340 has received the bus access information from the monitoring controller 320 as the read access by the monitoring process, the bus access information controller 340 executes the following operations. The bus access information controller 340 requests the pointer controller 332 to update the pointer reference value of the pointer P2. Further, the bus access information controller 340 requests the storage unit 304 to output the bus access information (specifically, read data) corresponding to the ID set in the ID controller 331 and the pointer reference value set in the pointer controller 332. Further, the bus access information controller 340 requests the determination controller 350 for comparison of the bus access information (specifically, read address) corresponding to the ID set in the ID controller 331 and the pointer reference value set in the pointer controller 332. Further, the bus access information controller 340 outputs the bus access information (specifically, read address) from the monitoring processing execution PE to the comparator 371. When the bus access information controller 340 acquires the read data from the storage unit 304, the bus access information controller 340 outputs the read data to the monitoring processing execution PE via the monitoring controller 320. The read address is a read destination address and the read data is the data that has been read out.

Further, when the bus access information controller 340 has received the bus access information from the monitoring controller 320 as the write access by the monitoring process, the bus access information controller 340 executes the following operations. The bus access information controller 340 requests the pointer controller 332 to update the pointer reference value of the pointer P2. Further, the bus access information controller 340 requests the determination controller 350 for comparison of the bus access information (specifically, write address and write data) corresponding to the ID set in the ID controller 331 and the pointer reference value set in the pointer controller 332. Further, the bus access information controller 340 outputs the bus access information from the monitoring processing execution PE (specifically, write address and write data) to the comparator 371. The write address means the write destination address and the write data means data to be written.

<Determination Controller 350>

The determination controller 350 is a control circuit that controls determination of the operation of the PE to be monitored based on the bus access information regarding the access by the process to be monitored and the bus access information regarding the access by the monitoring process. The determination controller 350 specifically performs the following operations.

When the determination controller 350 receives the request for comparing the bus access information from the bus access information controller 340, the determination controller 350 requests the storage unit 304 to output, to the comparison/determination unit 305, the bus access information regarding the process to be monitored corresponding to the ID and the pointer that have been requested. Further, the determination controller 350 receives the result of the comparison from the comparison/determination unit 305. When the result of the comparison indicates that the bus access information coincide with each other, the determination controller 350 waits until it receives a request for the next comparison. When the result of the comparison indicates that the bus access information do not coincide with each other, the determination controller 350 executes predetermined error processing. This error processing may be, for example, processing for requesting the PE to be monitored and the monitoring processing execution PE to perform a predetermined interruption processing or may be processing for requesting the PE to be monitored and the monitoring processing execution PE to perform reset processing. The determination controller 350 may be called an error processing unit. In this way, the error processing is executed, whereby it is possible to reduce the damage in the system, which is due to the abnormality of the processor element.

<Storage Unit 304>

The storage unit 304 is, as shown in FIG. 2, a storage device including the storage controller 361 and storage areas 362 and 363. In the following description, each component will be described.

<Storage Controller 361>

The storage controller 361 is a control circuit that controls operations of the storage unit 304. The storage controller 361 specifically performs the following operations.

The storage controller 361 requests, in response to the requests from the ID controller 331 and the pointer controller 332, one of the storage areas 362 and 363 which is the storage area for the PE to be monitored to store the ID and the pointer reference value.

Further, when the storage controller 361 receives the request for reserving the storage area from the storage area information controller 334, the storage controller 361 performs control to reserve the area corresponding to the storage capacity indicated by the storage area information in the storage area for the PE to be monitored among the storage areas 362 and 363. When the storage controller 361 receives the request for releasing the storage area from the storage area information controller 334, the storage controller 361 performs control to release the storage area that has been reserved.

The storage controller 361 performs control to store, in response to the request from the bus access information controller 340, the bus access information regarding the bus access by the process to be monitored in the area that has been reserved in association with the ID regarding the process to be monitored. Further, the storage controller 361 acquires, in response to the request from the bus access information controller 340, the read data as a response to the read access by the monitoring process from the storage area and outputs the acquired data to the bus access information controller 340. At this time, specifically, the storage controller 361 requests the storage area for the PE to be monitored (that is, one of the storage areas 362 and 363) to pass the read data stored in the storage location specified by the ID and the pointer reference value and outputs the read data that has been thus acquired to the bus access information controller 340.

Further, the storage controller 361 requests, in response to the request from the determination controller 350, the storage area for the PE to be monitored (i.e., one of the storage areas 362 and 363) to pass the bus access information regarding the process to be monitored stored in the storage location specified by the ID and the pointer reference value to the comparison/determination unit 305.

<Storage Areas 362 and 363>

Each of the storage areas 362 and 363 is, for example, a memory. The storage area 362 is a storage area for the PE 100 and the storage area 363 is a storage area for the PE 200. The storage area 362 stores the ID and the pointer generated when the PE 100 is a PE to be monitored and the bus access information associated with the execution of the process to be monitored by the PE 100. In a similar way, the storage area 363 stores the ID and the pointer generated when the PE 200 is a PE to be monitored and the bus access information associated with the execution of the process to be monitored by the PE 200.

That is, the storage area 362 stores, in response to the request from the storage controller 361, the ID regarding the process to be monitored executed by the PE 100, which is a PE to be monitored. In a similar way, the storage area 363 stores, in response to the request from the storage controller 361, the ID regarding the process to be monitored executed by the PE 200, which is a PE to be monitored. Further, the storage area 362 stores, in response to the request from the storage controller 361, the reference value of the pointer P1 regarding the process to be monitored executed by the PE 100, which is a PE to be monitored. In a similar way, the storage area 363 stores, in response to the request from the storage controller 361, the reference value of the pointer P1 regarding the process to be monitored executed by the PE 200, which is a PE to be monitored. Further, the storage area 362 stores, in response to the request from the storage controller 361, the bus access information that has been generated by the execution of the process to be monitored by the PE 100 in the storage location specified by the ID and the pointer reference value. In a similar way, the storage area 363 stores, in response to the request from the storage controller 361, the bus access information that has been generated by the execution of the process to be monitored by the PE 200 in the storage location specified by the ID and the pointer reference value. Further, the storage areas 362 and 363 pass, in response to the request from the storage controller 361, the read data stored in the storage location specified by the ID and the pointer reference value to the storage controller 361. Further, the storage areas 362 and 363 pass, in response to the request from the storage controller 361, the bus access information stored in the storage location specified by the ID and the pointer reference value to the comparison/determination unit 305.

<Comparison/Determination Unit 305>

The comparison/determination unit 305 is, as shown in FIG. 2, a control circuit that includes a comparator 371 and a comparison result notifying unit 372. In the following, each component will be described.

<Comparator 371>

The comparator 371 compares the bus access information regarding the process to be monitored output from the storage unit 304 with the bus access information regarding the monitoring process output from the bus access information controller 340 and outputs the result of the comparison to the comparison result notifying unit 372. When the bus access information to be compared is the bus access information regarding the read access, the comparator 371 performs comparison for the read address. When the bus access information to be compared is the bus access information regarding the write access, the comparator 371 performs comparison for the write address and the write data.

<Comparison Result Notifying Unit 372>

The comparison result notifying unit 372 is a control circuit that notifies the determination controller 350 of the result of the comparison output from the comparator 371.

<Operational Example of Multiprocessor System 10>

Next, the operational example of the multiprocessor system 10 will be described. First, the operational example when the interruption does not occur will be described.

<Operational Example 1>

Figure 4A:
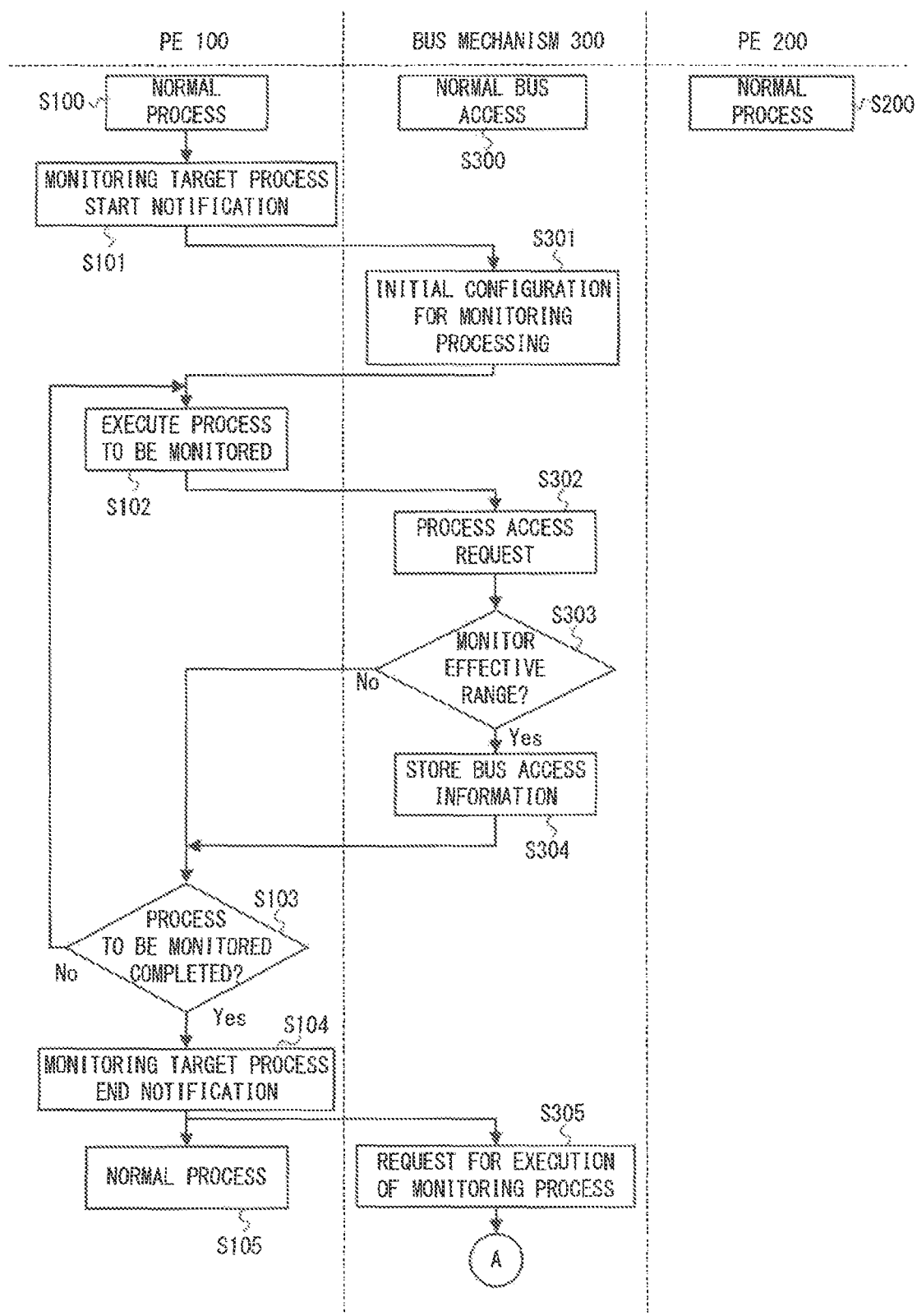
FIG. 4A is a flowchart showing an operational example when interruption does not occur in the multiprocessor system according to the first embodiment.
Figure 4B:
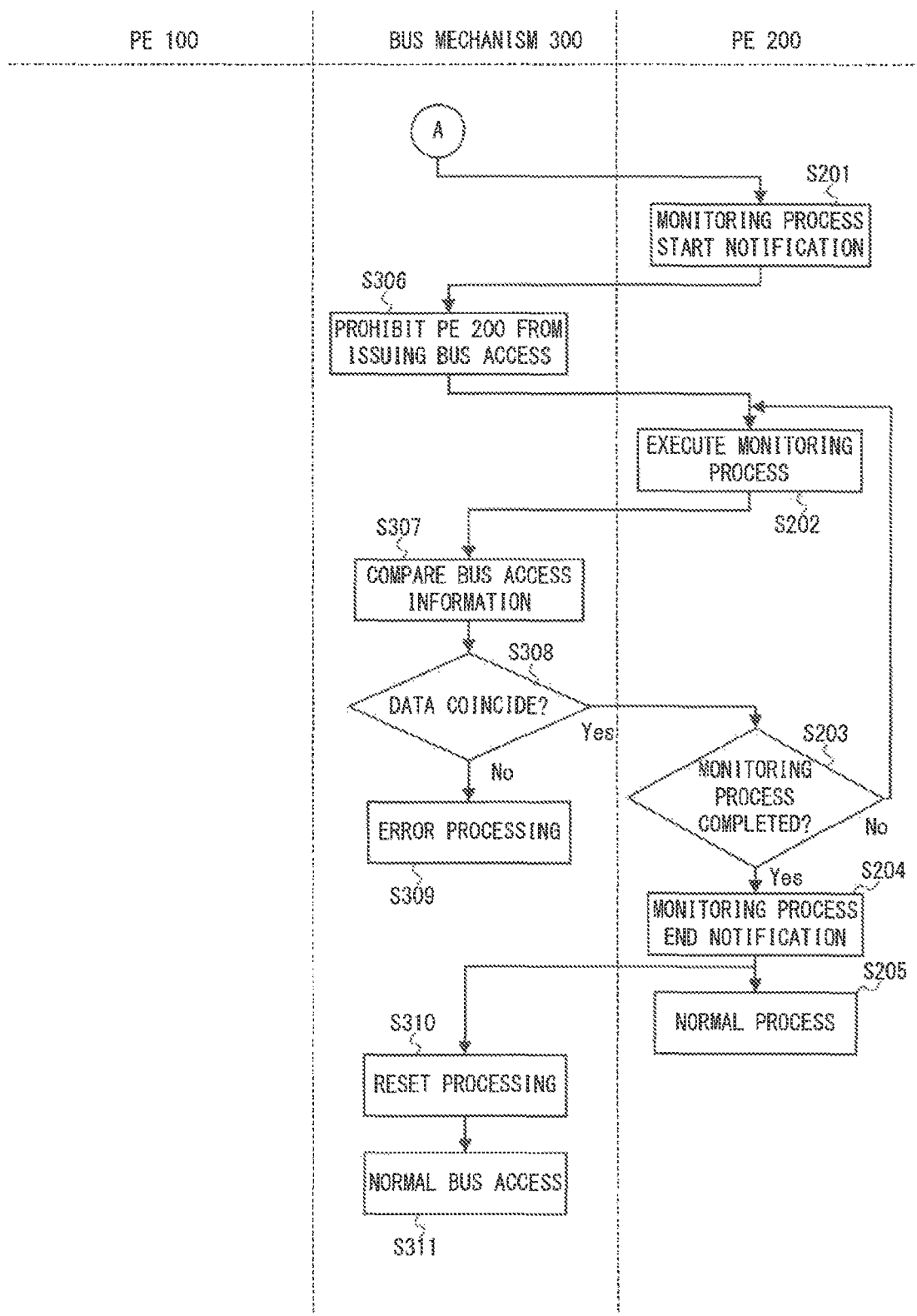
FIG. 4B is a flowchart showing an operational example when interruption does not occur in the multiprocessor system according to the first embodiment.

FIGS. 4A and 4B are a flowchart showing an operational example when the interruption does not occur in the multiprocessor system 10 according to the first embodiment. In the following description, with reference to the flowchart shown in FIGS. 4A and 4B, the operational example of the multiprocessor system 10 will be described.

In Step 100 (S100), it is assumed that the PE 100 executes the normal process. In a similar way, in Step 200 (S200), it is assumed that the PE 200 executes the normal process. At this time, the bus mechanism 300 executes a normal bus access (Step 300 (S300)). That is, while the bus mechanism 300 performs the writing processing or the reading processing with respect to the peripheral IP group 400 in response to the access request for the peripheral IP group 400 by the PE 100 or the PE 200, the bus mechanism 300 does not perform processing for monitoring.

When it is assumed that the PE 100 executes the process to be monitored, in Step 101 (S101), the PE 100 outputs the monitoring target process start notification, the monitor effective range information, and the storage area information to the bus mechanism 300.

On the other hand, in Step 301 (S301), the bus mechanism 300 executes the initial configuration for the monitoring processing. Specifically, the bus mechanism 300 performs the following processing. The bus mechanism 300 reserves the area to store the bus access information generated by the process to be monitored in the storage area 362 based on the storage area information. Further, the bus mechanism 300 sets the ID for the process to be monitored and stores this ID. Further, the bus mechanism 300 sets the pointer corresponding to this ID and stores this pointer. Further, the bus mechanism 300 stores the monitor effective range information. After this step, the bus mechanism 300 treats the access from the PE 100 as the access occurred by the process to be monitored.

While the area is reserved based on the storage area information in this embodiment, the storage area information may not be necessarily input to the bus mechanism 300. In this case, the bus mechanism 300 may reserve, for example, a predetermined sufficient area.

In Step 102 (S102), the PE 100 executes the process to be monitored. The PE 100 requests, for example, the bus mechanism 300 for the read access for the peripheral IP group 400, performs an operation based on the read data, and requests the bus mechanism 300 for the write access to write the results of the operation into the peripheral IP group 400.

The bus mechanism 300 processes the access request sent from the PE 100 (Step 302 (S302)). Specifically, the bus mechanism 300 outputs, in response to the read access request sent from the PE 100, the read data from the peripheral IP group 400 to the PE 100. Further, the bus mechanism 300 writes, in response to the write access request sent from the PE 100, the write data in the peripheral IP group 400.

When the bus mechanism 300 has received the access request sent from the PE 100, i.e., when the bus mechanism 300 has received the bus access information from the PE 100, the bus mechanism 300 determines whether the access destination is within the monitor effective range (Step 303 (S303)).

When the access destination is within the monitor effective range, in Step 304 (S304), the bus mechanism 300 stores the bus access information in the area reserved in Step 301. That is, the bus mechanism 300 stores the read address and the read data in response to the read access and stores the write address and the write data in response to the write access. In this way, the storage unit 304 of the bus mechanism 300 stores the bus access information regarding the access included in the access range notified as the target to be monitored.

In the PE 100, Step 102 is repeated until the execution of the process to be monitored is completed (No in Step 103 (S103)). When the PE 100 completes the execution of the process to be monitored (Yes in Step 103), the PE 100 outputs the monitoring target process end notification to the bus mechanism 300 (Step 104 (S104)). After that, the PE 100 executes the normal process (Step 105 (S105)).

In Step 305 (S305), when the bus mechanism 300 receives the monitoring target process end notification from the PE 100, the bus mechanism 300 requests the PE 200 to execute the monitoring process. On the other hand, when an idle time is generated, the PE 200 executes the monitoring process. When the bus mechanism 300 requests the PE 200 to execute the monitoring process, the bus mechanism 300 may notify the PE 200 of the information to specify the monitoring process that should be executed. When the bus mechanism 300 does not notify the PE 200 of the information to specify the monitoring process that should be executed, the PE 200 executes, for example, a predetermined monitoring process.

In Step 201 (S201), the PE 200 outputs the monitoring process start notification to the bus mechanism 300 when it starts execution of the monitoring process.

In Step 306 (S306), the bus mechanism 300 that has received the monitoring process start notification from the PE 200 prohibits the PE 200 from accessing the peripheral IP group 400. In the following processes, the actual access to the peripheral IP group 400 is not executed in response to the access request for the peripheral IP group 400 associated with the execution of the monitoring process in the PE 200. In this way, since the actual access is prohibited, it is possible to prevent the data in the peripheral IP group from being rewritten due to the execution of the monitoring process.

In Step 202 (S202), the PE 200 executes the monitoring process. The PE 200 requests, for example, the bus mechanism 300 to perform the read access to the peripheral IP group 400, performs an operation based on the read data, and requests the bus mechanism 300 for the write access to write the results of the operation into the peripheral IP group 400. At this time, even when the write access request is sent from the PE 200, writing processing into the peripheral IP group 400 is not performed. Further, even when the read access request is sent from the PE 200, the reading processing from the peripheral IP group 400 is not executed and the read data stored in the storage area 362 is passed to the PE 200. In other words, the bus mechanism 300 outputs the read data by the PE 100 stored in the storage unit 304 to the PE 200 in response to the read access request for the peripheral IP group 400 by the PE 200 and does not perform the write access to the peripheral IP group 400 in response to the write access request for the peripheral IP group 400 by the PE 200 while the PE 200 is executing the monitoring process.

In Step 307 (S307), the bus mechanism 300 compares the bus access information. Specifically, the bus mechanism 300 compares the bus access information of the access request sent from the PE 200 with the bus access information of the access request sent from the PE 100 stored in Step 304. In this case, the comparison is performed for the bus access information of the access request in which the access destination is within the monitor effective range. That is, the comparator 371 of the bus mechanism 300 compares the bus access information regarding the access included in the access range regarding which the notification has been sent as the target to be monitored.

The comparator 371 of the bus mechanism 300 compares, as the comparison of the bus access information regarding the read access, the read address of the PE 100 stored in the storage unit 304 with the read address input from the PE 200 when the PE 200 has executed the monitoring process. It is therefore possible to determine whether the read access has been appropriately executed. Further, the comparator 371 compares, as the comparison of the bus access information regarding the write access, the write address of the PE 100 stored in the storage unit 304 with the write address input from the PE 200 when the PE 200 has executed the monitoring process and compares the write data of the PE 100 stored in the storage unit 304 with the write data input from the PE 200 when the PE 200 has executed the monitoring process. It is therefore possible to determine whether the write access has been appropriately executed.

When both the above former and latter bus access information do not coincide with each other (No in Step 308 (S308)), the bus mechanism 300 executes predetermined error processing (Step 309 (S309)). The bus mechanism 300 requests, for example, the PE 100 and the PE 200 to perform the interruption processing or the like.

When the both bus access information coincide with each other (Yes in Step 308), in the PE 200, Step 202 is repeated until the execution of the monitoring process is completed (No in Step 203 (S203)). When the execution of the monitoring process is completed (Yes in Step 203), the PE 200 outputs the monitoring process end notification to the bus mechanism 300 (Step 204 (S204)). After that, the PE 200 executes the normal process (Step 205 (S205)).

In Step 310 (S310), when the bus mechanism 300 receives the monitoring process end notification from the PE 200, the bus mechanism 300 performs reset processing regarding the monitoring processing. Specifically, the bus mechanism 300 deletes the ID, the pointer, and the monitor effective range and releases the area that has been reserved in Step 301. After that, the bus mechanism 300 executes the normal bus access (Step 311 (S311)).

<Operational Example 2>

Figure 5A:
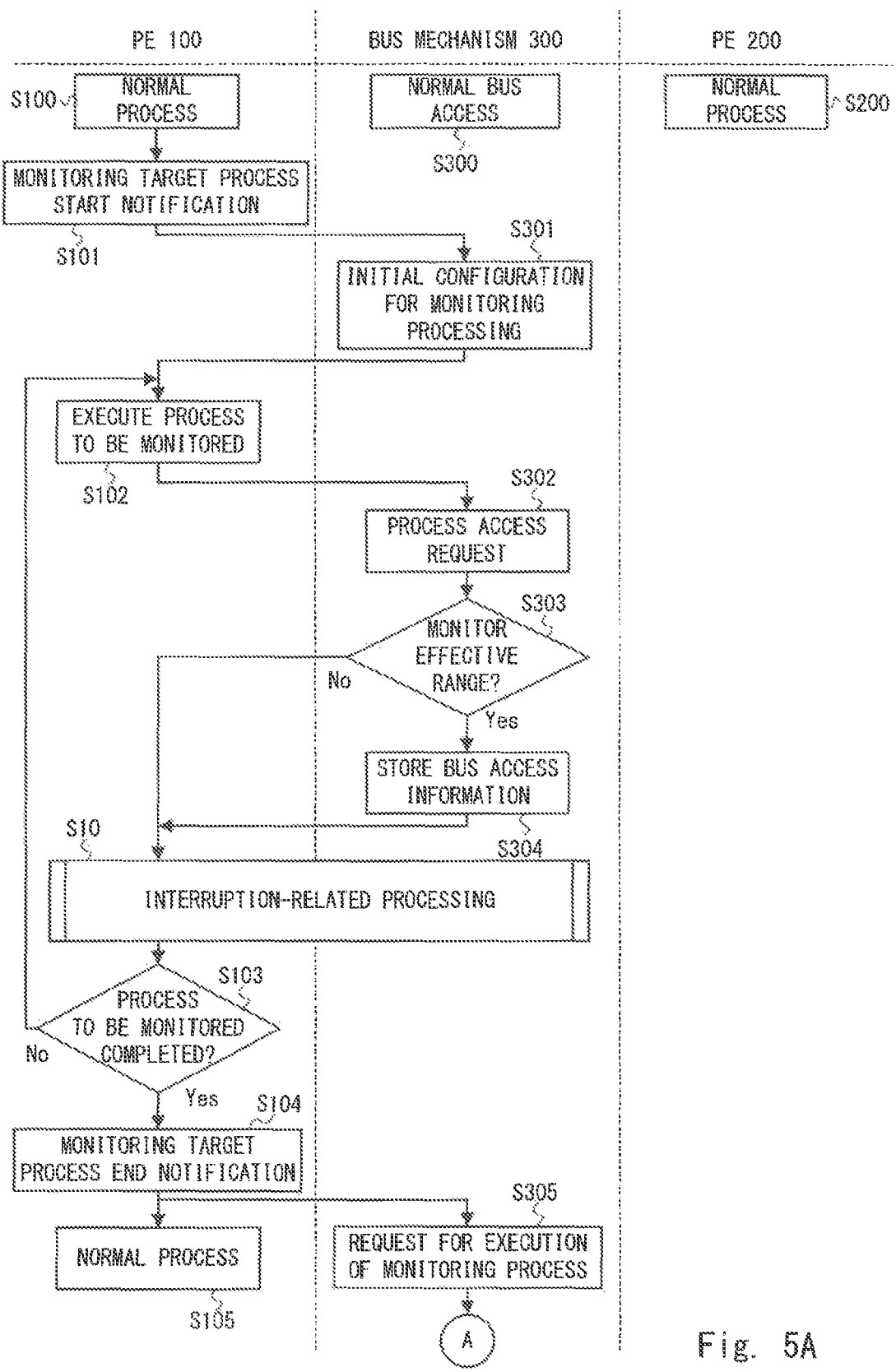
FIG. 5A is a flowchart showing an operational example when interruption processing occurs in a PE which is executing a process to be monitored.
Figure 5B:
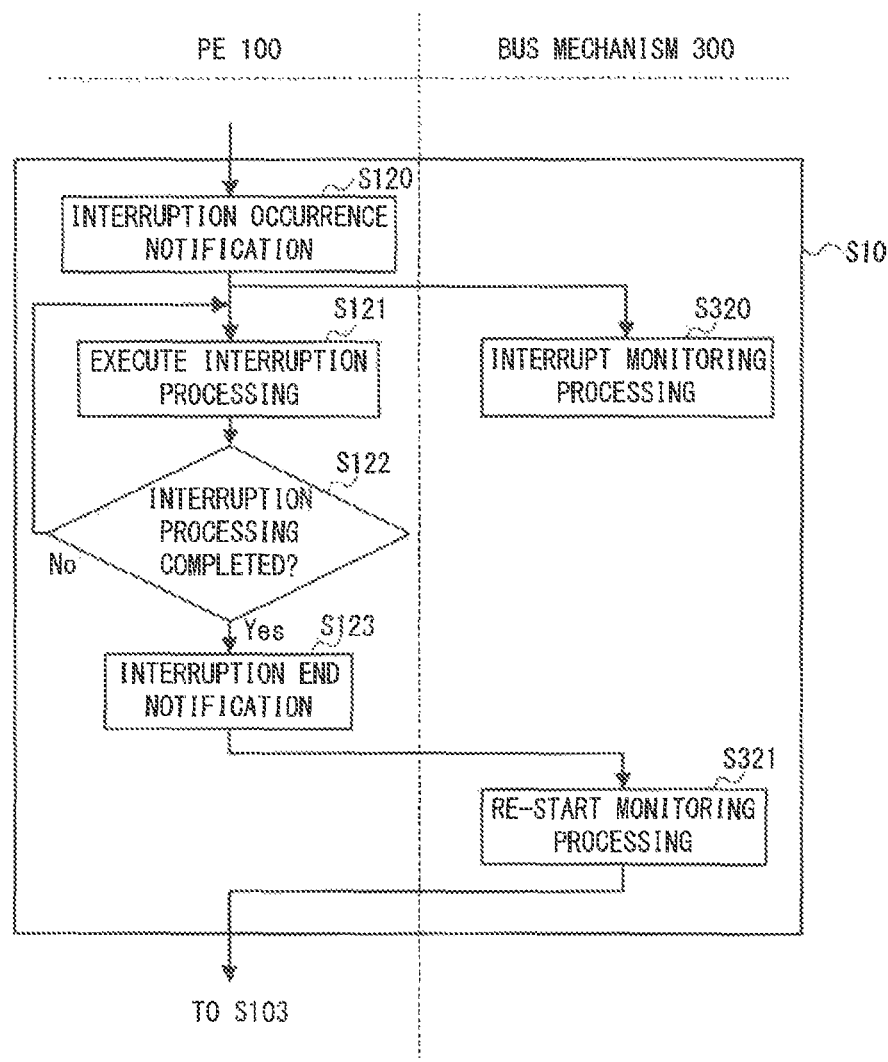
FIG. 5B is a flowchart showing an operational example of interruption-related processing when interruption processing which does not include the process to be monitored occurs in the PE which is executing the process to be monitored.

Next, an operational example when the interruption processing that does not include the process to be monitored occurs in the PE 100 which is executing the process to be monitored will be described. FIG. 5A is a flowchart showing an operational example when the interruption processing occurs in the PE 100 which is executing the process to be monitored. FIG. 5B is a flowchart showing an operational example of the interruption-related processing when the interruption processing which does not include the process to be monitored has occurred in the PE 100 which is executing the process to be monitored. When the interruption processing occurs in the PE 100 which is executing the process to be monitored, as shown in FIG. 5A, the interruption-related processing (Step 10 (S10)) occurs in the PE 100 and the bus mechanism 300. The flowchart shown in FIG. 5A is the same as the flowchart shown in FIG. 4A except that the interruption-related processing (Step 10) is added in FIG. 5A. Therefore, descriptions of the steps in the flowchart shown in FIG. 5A will be omitted. Specific operations of the interruption-related processing in Step 10 are shown in FIG. 5B. In the following description, with reference to the flowchart shown in FIG. 5B, operational examples of the interruption-related processing that occurs in the multiprocessor system 10 will be described.

In the interruption-related processing, in Step 120 (S120), the PE 100 outputs the interruption occurrence notification to the bus mechanism 300 when it starts execution of the interruption processing. Then in Step 121 (S121), the PE 100 executes the interruption processing that does not include the process to be monitored.

When the bus mechanism 300 receives the interruption occurrence notification, the bus mechanism 300 interrupts the monitoring processing (Step 320 (S320)). The bus mechanism 300 saves the ID, the pointer, and the monitor effective range information when it interrupts the monitoring processing.

In the PE 100, Step 121 is repeated until the interruption processing is completed (No in Step 122 (S122)). When the interruption processing is completed (Yes in Step 122), the PE 100 outputs the interruption end notification to the bus mechanism 300 (Step 112 (S123)).

When the bus mechanism 300 receives the interruption end notification, the bus mechanism 300 re-starts the monitoring processing (Step 321 (S321)). The bus mechanism 300 restores the ID, the pointer, and the monitor effective range information that have been saved when it re-starts the monitoring processing. After that, the process of Step 103 and the following processes in FIG. 4A are performed.

<Operational Example 3>

Figure 6A:
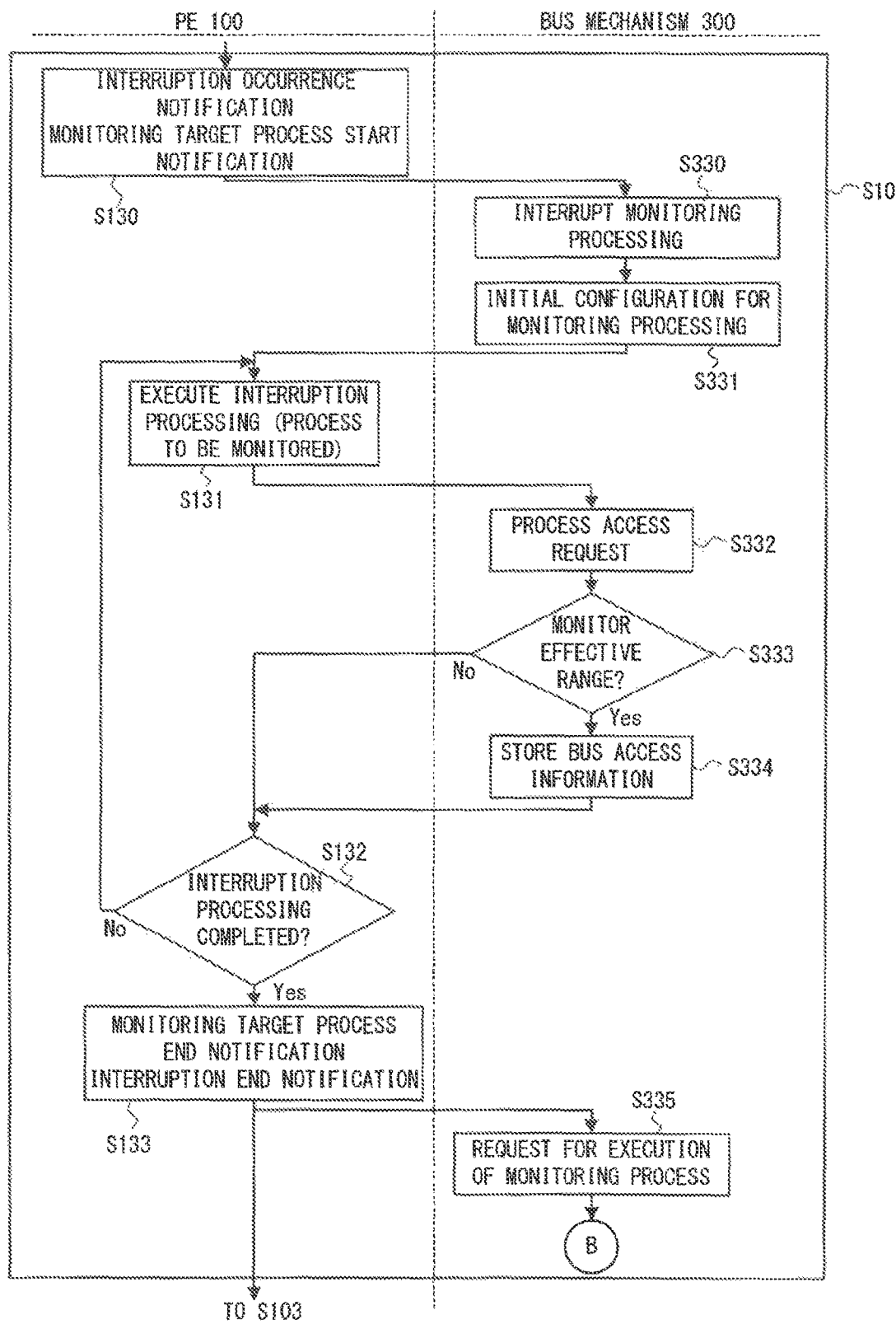
FIG. 6A is a flowchart showing an operational example of the interruption-related processing when interruption processing which includes the process to be monitored occurs in the PE which is executing the process to be monitored.
Figure 6B:
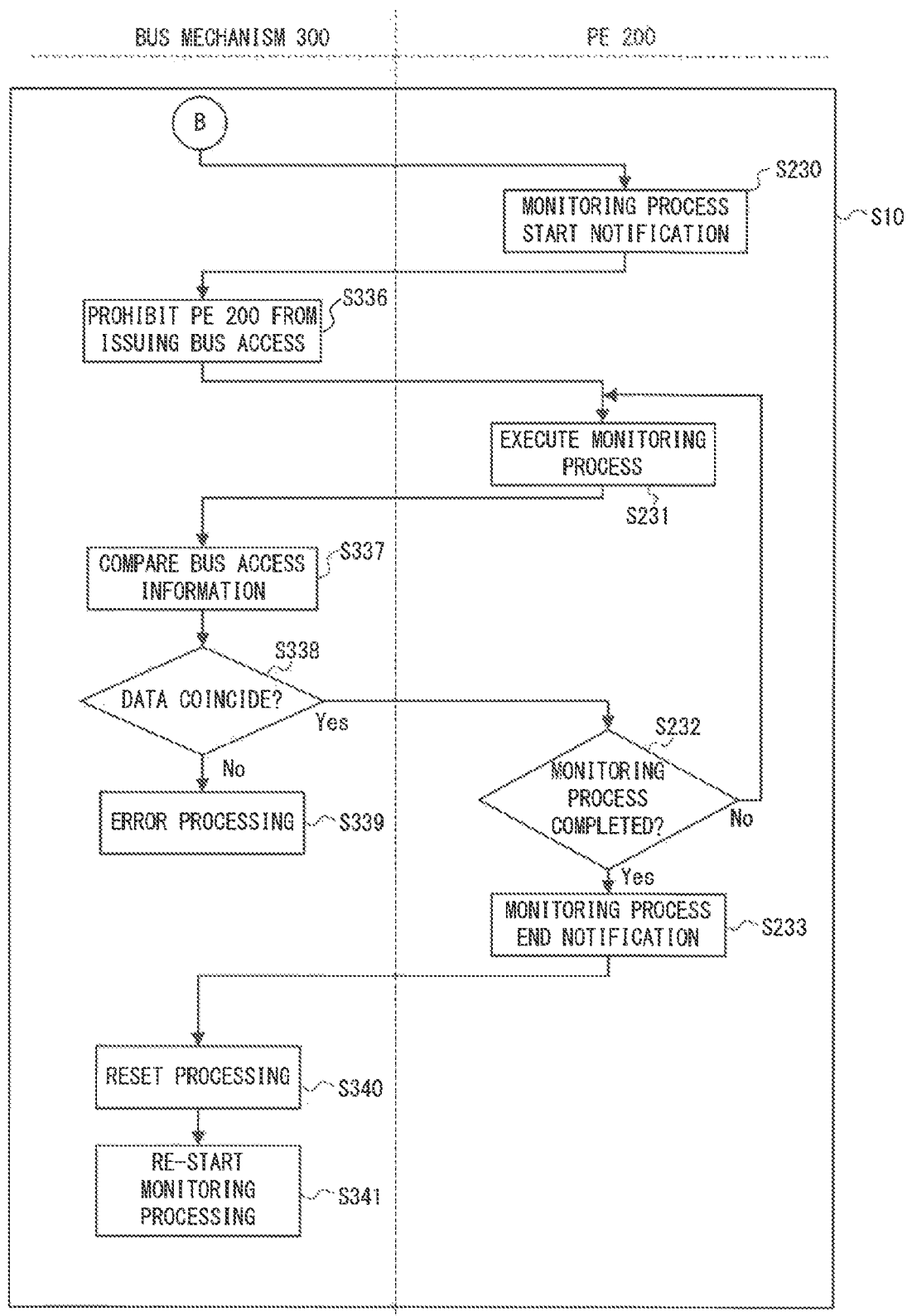
FIG. 6B is a flowchart showing an operational example of the interruption-related processing when the interruption processing which includes the process to be monitored occurs in the PE which is executing the process to be monitored.

Next, an operational example in a case in which the interruption processing including the process to be monitored has occurred in the PE 100 which is executing the process to be monitored will be described. In this case as well, the flowchart shown in FIG. 5A is an operational example. However, regarding the interruption-related processing in Step 10, the flowchart shown in FIGS. 6A and 6B, not the flowchart shown in FIG. 5B, is the operational example. FIGS. 6A and 6B are a flowchart showing an operational example of the interruption-related processing in a case in which the interruption processing including the process to be monitored has occurred in the PE 100 which is executing the process to be monitored. In the following description, with reference to the flowchart shown in FIGS. 6A and 6B, an operational example in a case in which the interruption processing including the process to be monitored has occurred in the PE 100 will be described.

In the interruption-related processing in this operational example, in Step 130 (S130), the PE 100 outputs the interruption occurrence notification, the monitoring target process start notification, the monitor effective range information, and the storage area information to the bus mechanism 300 when it starts execution of the interruption processing.

In Step 330 (S330), when the bus mechanism 300 receives the interruption occurrence notification, the bus mechanism 300 interrupts the monitoring processing of the process to be monitored that has been the target to be monitored (hereinafter this process will be called a first process to be monitored). When the bus mechanism 300 interrupts the monitoring processing of the first process to be monitored, the bus mechanism 300 saves the ID, the pointer, and the monitor effective range information regarding the first process to be monitored.

In Step 331 (S331), the bus mechanism 300 executes the initial configuration for the monitoring processing of a new process to be monitored (hereinafter this process will be called a second process to be monitored) in the interruption processing. Specifically, the bus mechanism 300 performs the following processing. The bus mechanism 300 reserves the area for storing the bus access information generated by the second process to be monitored in the storage area 362 based on the storage area information. Further, the bus mechanism 300 sets the ID for the second process to be monitored and stores this ID. Further, the bus mechanism 300 sets the pointer corresponding to this ID and stores this pointer. Further, the bus mechanism 300 stores the monitor effective range information regarding the second process to be monitored. After this step, the bus mechanism 300 treats the access from the PE 100 as the access occurred by the process to be monitored.

In the following, the operations similar to the operation of S102 and the following operations in FIG. 4A are performed. Therefore, the process in Step 331 and the following processes will be described in brief.

In Step 131 (S131), similar to S102 in FIG. 4A, the PE 100 executes the interruption processing, that is, the second process to be monitored.

The bus mechanism 300 processes, similar to S302 in FIG. 4A, the access request sent from the PE 100 (Step 332 (S332)).

Similar to S303 in FIG. 4A, the bus mechanism 300 determines, when the access request is sent from the PE 100, whether the access destination is within the monitor effective range (Step 333 (S333)).

When the access destination is within the monitor effective range, similar to S304 in FIG. 4A, in Step 334 (S334), the bus mechanism 300 stores the bus access information in the area reserved in Step 331. That is, the storage unit 304 stores, in the area provided for each process to be monitored, the bus access information regarding the access to the peripheral IP group 400 that occurs when the process to be monitored is executed. Accordingly, when the interruption processing regarding another new process to be monitored has occurred in the PE 100 while the PE 100 is executing the process to be monitored, the bus mechanism 300 stores the bus access information regarding the interruption processing in an area different from the area corresponding to the process to be monitored before the interruption processing occurs. In this way, the bus access information is managed for each process to be monitored, whereby it is possible to appropriately execute the monitoring processing for each process to be monitored even when the interruption processing occurs.

In the PE 100, Step 131 is repeated until the execution of the second process to be monitored is completed (No in Step 132 (S132)). When the execution of the second process to be monitored is completed (Yes in Step 132), the PE 100 outputs the monitoring target process end notification and the interruption end notification to the bus mechanism 300 (Step 133 (S133)).

In Step 335 (S335), similar to S305 in FIG. 4A, when the bus mechanism 300 receives the monitoring target process end notification regarding the second process to be monitored from the PE 100, the bus mechanism 300 requests the PE 200 to execute the monitoring process regarding the second process to be monitored (hereinafter this process will be called a second monitoring process). On the other hand, the PE 200 executes the second monitoring process when an idle time is generated.

In Step 230 (S230), similar to S201 in FIG. 4B, the PE 200 outputs the monitoring process start notification to the bus mechanism 300 when it starts execution of the second monitoring process.

In Step 336 (S336), similar to S306 in FIG. 4B, the bus mechanism 300 that has received the monitoring process start notification from the PE 200 prohibits the PE 200 from accessing the peripheral IP group 400.

In Step 231 (S231), similar to S202 in FIG. 4B, the PE 200 executes the second monitoring process.

In Step 337 (S337), similar to S307 in FIG. 4B, the bus mechanism 300 compares the bus access information. When the both bus access information do not coincide with each other (No in Step 338 (S338)), the bus mechanism 300 executes a predetermined error processing, similar to S309 in FIG. 4B (Step 339 (S339)).

When the both bus access information coincide with each other (Yes in Step 338), in the PE 200, Step 231 is repeated until the execution of the second monitoring process is completed (No in Step 232 (S232)). When the execution of the second monitoring process is completed (Yes in Step 232), the PE 200 outputs the monitoring process end notification regarding the second monitoring process to the bus mechanism 300 (Step 233 (S233)).

In Step 340 (S340), similar to S310 in FIG. 4B, when the bus mechanism 300 receives the monitoring process end notification from the PE 200, the bus mechanism 300 performs reset processing regarding the monitoring processing of the second process to be monitored. Further, in Step 341 (S341), the bus mechanism 300 re-starts monitoring processing regarding the first process to be monitored. That is, the bus mechanism 300 restores the ID, the pointer, and the monitor effective range information that have been saved when it re-starts the monitoring processing. After that, the PE 100 re-starts the execution of the first process to be monitored and the process in Step 103 and the following processes in FIG. 4A are performed.

<Operational Example 4>

Figure 7A:
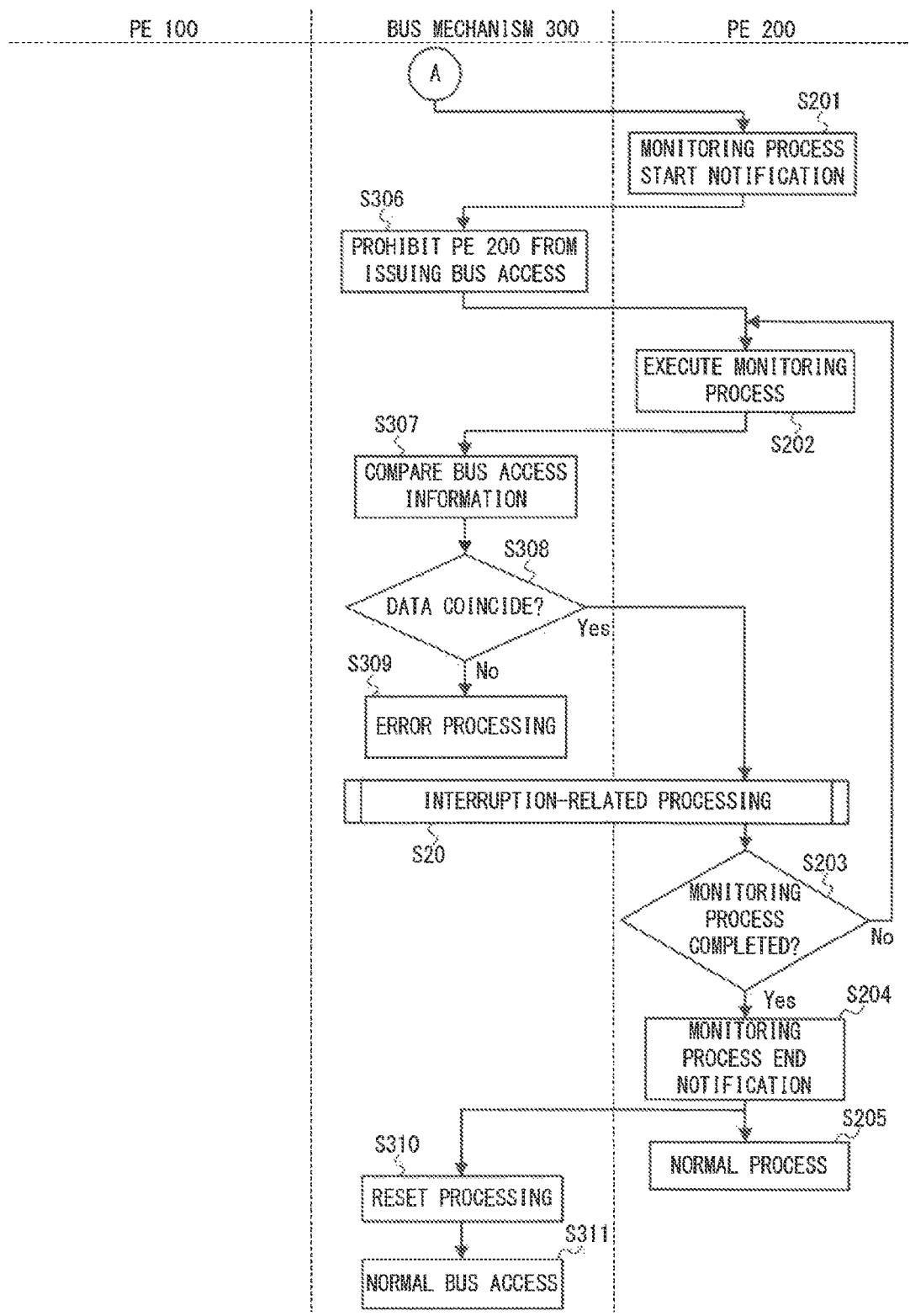
FIG. 7A is a flowchart showing an operational example when the interruption processing occurs in the PE which is executing the monitoring process.
Figure 7B:
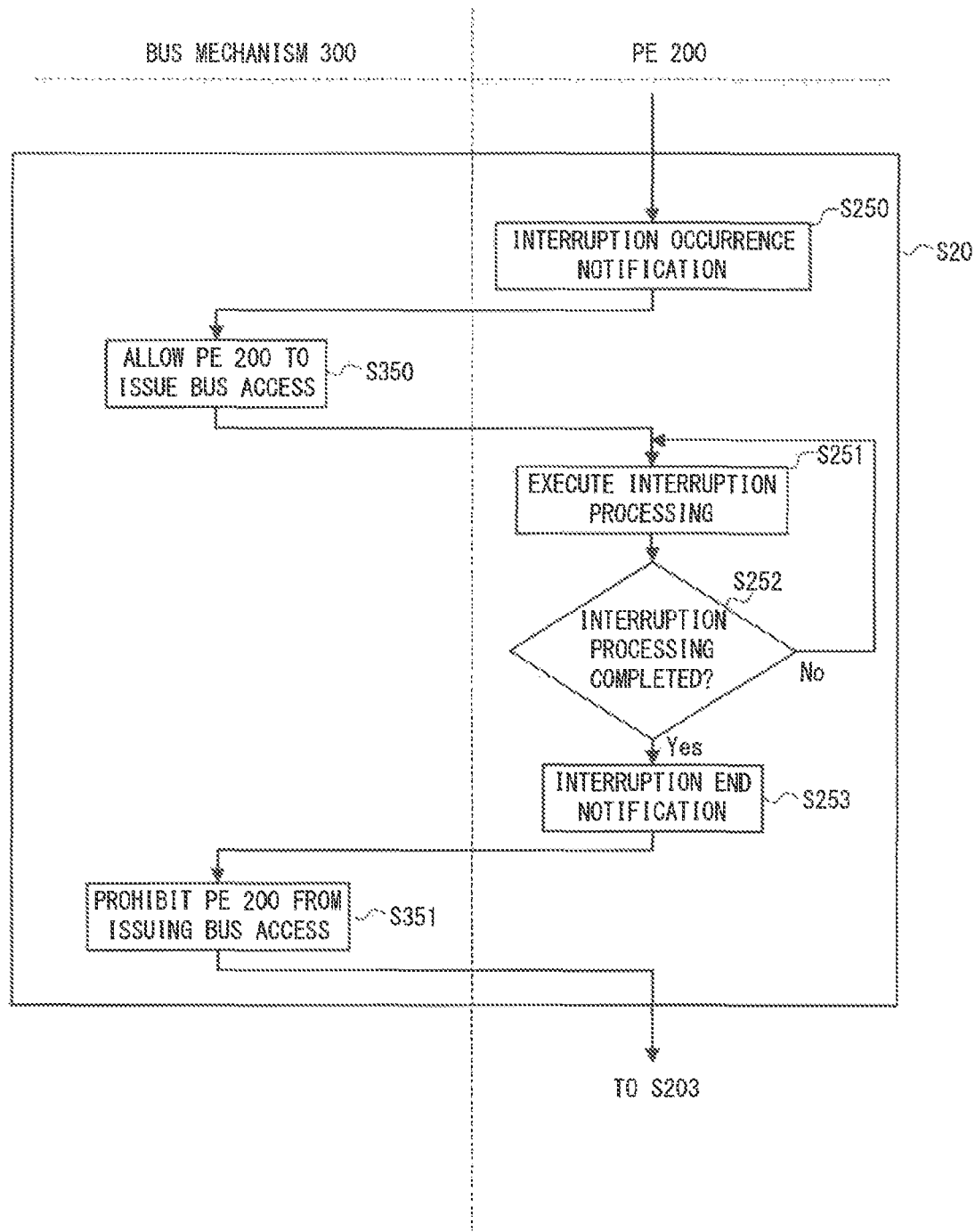
FIG. 7B is a flowchart showing an operational example of the interruption-related processing when the interruption processing occurs in the PE which is executing the monitoring process.

Next, an operational example when the interruption processing has occurred in the PE 200 which is executing the monitoring process will be described. In this case, the flowchart shown in FIG. 4B is replaced by a flowchart shown in FIG. 7A. That is, after the flowchart shown in FIG. 4A, the flowchart shown in FIG. 7A is executed. FIG. 7A is a flowchart showing an operational example when the interruption processing occurs in the PE 200 which is executing the monitoring process. FIG. 7B is a flowchart showing an operational example of the interruption-related processing when the interruption processing occurs in the PE 200 which is executing the monitoring process.

When the interruption processing occurs in the PE 200 which is executing the monitoring process, as shown in FIG. 7A, the interruption-related processing (Step 20 (S20)) occurs in the PE 200 and the bus mechanism 300. The flowchart shown in FIG. 7A is the same as the flowchart shown in FIG. 4B except that interruption-related processing (Step 20) is added. Accordingly, the description of the steps of the flowchart shown in FIG. 7A will be omitted. Specific operations of the interruption-related processing in Step 20 are shown in FIG. 7B. In the following description, with reference to the flowchart shown in FIG. 7B, an operational example of the interruption-related processing occurred in the multiprocessor system 10 will be described.

In the interruption-related processing according to this operational example, in Step 250 (S250), the PE 200 outputs the interruption occurrence notification to the bus mechanism 300 when it starts execution of the interruption processing.

In Step 350 (S350), when the bus mechanism 300 receives the interruption occurrence notification from the PE 200, the bus mechanism 300 releases the prohibition of access by the PE 200 to the peripheral IP group 400 and executes the normal bus access. The PE 200 is therefore able to execute the interruption processing that involves the access to the peripheral IP group 400 (Step 251 (S251)).

In the PE 200, Step 251 is repeated until the interruption processing is completed (No in Step 252 (S252)). When the interruption processing is completed (Yes in Step 252), the PE 200 outputs the interruption end notification to the bus mechanism 300 (Step 253 (S253)).

In Step 351 (S351), when the bus mechanism 300 receives the interruption end notification, the bus mechanism 300 again prohibits the PE 200 from accessing the peripheral IP group 400. After that, the PE 200 re-starts executing the monitoring process and the process of Step 203 and the following processes shown in FIG. 4B are performed.

The first embodiment has been described above. In the multiprocessor system 10 according to this embodiment, as stated above, after the execution of the process to be monitored by the PE to be monitored is completed, the bus mechanism 300 requests the monitoring processing execution PE to execute the monitoring process. Then the monitoring processing execution PE executes the monitoring process at its own idle time. Therefore, the monitoring processing execution PE may not be the processor element dedicated for monitoring the PE to be monitored. Accordingly, according to the multiprocessor system 10, it is possible to achieve monitoring of the processor element while suppressing the cost.

Further, when the PEs 100 and 200 periodically execute a predetermined process including the process to be monitored in order to periodically achieve a predetermined processing, the following advantages are obtained. In each cycle, the monitoring processing execution PE is able to complete, for example, the execution of the predetermined process at time t1 and execute the monitoring process for monitoring the PE to be monitored using the idle time t2 (=T−t1) in the period T. Accordingly, the bus mechanism 300 is able to complete the monitoring processing for each cycle. That is, it is possible to detect the abnormality in the PE to be monitored by the time the next cycle is started. Further, when the PEs 100 and 200 periodically execute a predetermined process including the process to be monitored to periodically achieve the predetermined processing, the PEs 100 and 200 are each able to execute the monitoring process using its own idle time, whereby the bus mechanism 300 is able to monitor the PEs 100 and 200 in each cycle.

While four PEs are necessary in, for example, DLS, in order to detect an abnormality of arbitrary two independent processing in other techniques, two PEs can mutually perform monitoring independently from each other in this embodiment. It is therefore possible to reduce the cost. By the way, there are two methods for detecting an abnormality of the PE by software processing, not the abnormality detection method according to this embodiment.

The first method is to acquire, by each of two PEs, the read data from the peripheral IP group, to store data in different storage areas, and to perform operations, comparison, and determination. The second method is to use, by one PE, the read data acquired by another PE for the operations, comparison, and determination. The first method has a problem that the data acquired by one PE may be different from the data acquired by another PE due to, for example, the difference in the timings when the data is acquired from the peripheral IP group. That is, the problem in the first method is that the identity of the read data cannot be ensured. Further, in the second method, the PE needs to perform the processing for storing the read data that has been acquired in the storage area. This results in overhead and reduces the performance of the PE. Further, when there is an abnormality in the PE, the read data may not be correctly stored in the storage area. If another PE uses such read data, the abnormality cannot be correctly detected. This embodiment avoids the occurrence of the problems of the methods by the software processing.

<Second Embodiment>

Figure 8:
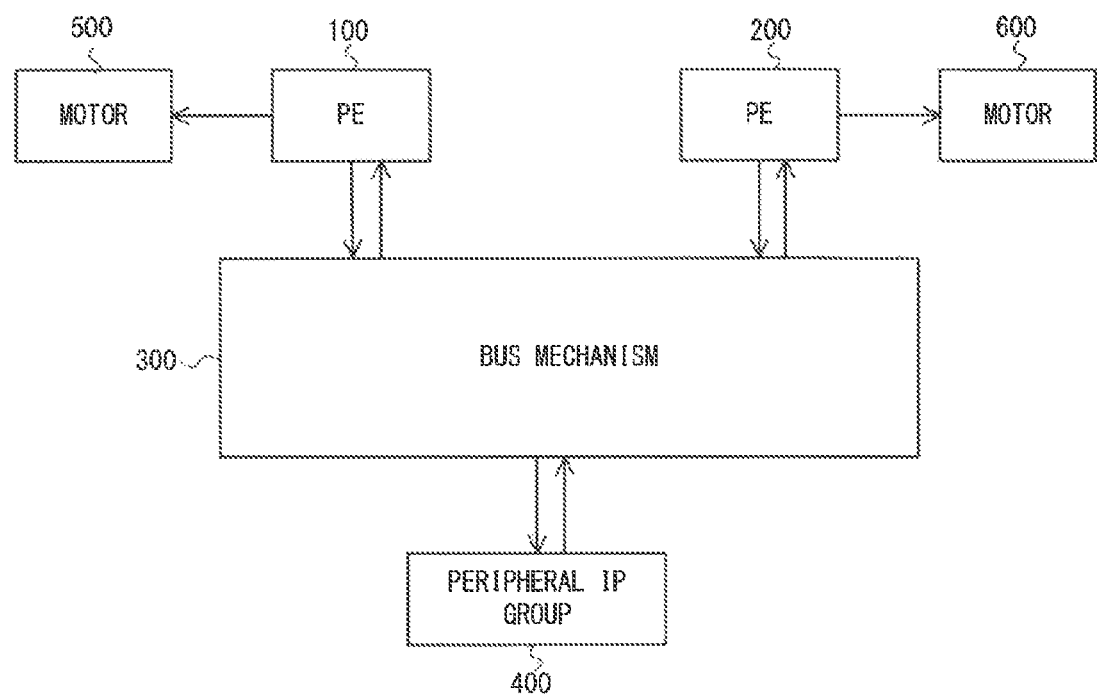
FIG. 8 is a block diagram showing one example of a configuration of a vehicle control system according to a second embodiment.

Next, a second embodiment will be described. The second embodiment is an embodiment regarding a vehicle control system that uses the multiprocessor system 10 according to the first embodiment. FIG. 8 is a block diagram showing one example of a configuration of a vehicle control system 20 according to the second embodiment. As shown in FIG. 8, the vehicle control system 20 is different from the multiprocessor system 10 according to the first embodiment in that motors 500 and 600 are further provided. The vehicle control system 20 is mounted on a vehicle (not shown). Therefore, in the following description, only the difference from the first embodiment will be described and overlapping descriptions will be omitted.

Each of the motors 500 and 600 is a motor mounted on the vehicle and is, for example, a driving source to drive the vehicle. Since the PEs 100 and 200 control the respective motors within a predetermined period of time, they execute processing for generating control signals such as rectangular waves within a predetermined period of time. The PE 100 generates a control signal to control the motor 500. Further, the PE 200 generates a control signal to control the motor 600.

The PEs 100 and 200 access the peripheral IP group 400 via the bus mechanism 300 when they generate the control signals. The generation of the control signal is periodically performed in a predetermined period. More specifically, each of the PEs 100 and 200 periodically executes the signal generating process for generating the control signal and the monitoring process. This signal generating process is a process to be monitored. That is, the PE 100 executes the signal generating process and executes the process to be monitored to monitor the execution of the signal generating process by the PE 200 during the period T. In a similar way, the PE 200 executes the signal generating process and executes the process to be monitored to monitor the execution of the signal generating process by the PE 100 during the period T. The PEs 100 and 200 execute the monitoring process in the time zone during which the signal generating process is not executed in the period T during which the signal generating process and the monitoring process are executed.

As a method of achieving the functional safety when two PEs control the respective motors, there is a method of preparing one or two PEs dedicated for monitoring for one PE. This method requires, however, at least four PEs. On the other hand, in this embodiment, the functional safety can be achieved by two PEs. That is, there is no need to prepare a PE dedicated for monitoring. In this way, according to this embodiment, it is possible to achieve the functional safety while suppressing the cost when a vehicle is controlled.

While the invention made by the present inventor has been specifically described above based on the embodiments, it is needless to say that the present invention is not limited to the embodiments already stated above and may be changed in various ways within the scope of the present invention.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A multiprocessor system, comprising:
   a first processor element;
   a second processor element;
   a circuit configured to be accessed by the first processor element; and
   a bus mechanism provided on an access path between the first processor element and the circuit,
   wherein the bus mechanism comprises:
      a storage unit configured to store bus access information regarding access to the circuit that occurs when the first processor element has executed a process to be monitored;
      a controller configured to request the second processor element to execute a monitoring process whose processing content is the same as that of the process to be monitored after the first processor element has completed the execution of the process to be monitored; and
      a comparison circuit configured to compare bus access information regarding access of the first processor element stored in the storage unit with bus access information input from the second processor element when the second processor element has executed the monitoring process, and
   wherein the second processor element executes the monitoring process in an idle time.

2. The multiprocessor system according to claim 1, wherein the second processor element periodically executes a predetermined process and the monitoring process, and
   wherein the idle time includes a time zone during which the predetermined process is not executed in a period during which the predetermined process and the monitoring process are executed in the second processor element.

3. The multiprocessor system according to claim 1, wherein the first processor element notifies the bus mechanism of start of execution of the process to be monitored when the execution of the process to be monitored is started, and
   wherein the bus mechanism performs processing by the storage unit, the controller, and the comparison circuit upon receiving a notification indicating that the execution of the process to be monitored is started.

4. The multiprocessor system according to claim 3, wherein the first processor element further notifies the bus mechanism of an access range to be monitored when the execution of the process to be monitored is started,
   wherein the storage unit stores bus access information regarding access included in the access range regarding which notification has been sent as a target to be monitored, and
   wherein the comparison circuit performs a comparison for bus access information regarding the access included in the access range regarding which notification has been sent as the target to be monitored.

5. The multiprocessor system according to claim 1, wherein while the second processor element is executing the monitoring process,
   wherein the bus mechanism outputs read data by the first processor element stored in the storage unit to the second processor element in a response to a read access request by the second processor element for the circuit, and
   wherein the bus mechanism does not perform a write access to the circuit in response to a write access request by the second processor element for the circuit.

6. The multiprocessor system according to claim 1, wherein the comparison circuit compares, as comparison of the bus access information regarding a read access, a read address of the first processor element stored in the storage unit with a read address input from the second processor element when the second processor element has executed the monitoring process.

7. The multiprocessor system according to claim 1, wherein as comparison of the bus access information regarding a write access,
wherein the comparison circuit compares a write address of the first processor element stored in the storage unit with a write address input from the second processor element when the second processor element has executed the monitoring process, and
wherein the comparison circuit compares write data of the first processor element stored in the storage unit with a write data input from the second processor element when the second processor element has executed the monitoring process.

8. The multiprocessor system according to claim 1, wherein the storage unit stores, in an area provided for each process to be monitored, bus access information regarding access to the circuit that occurs when the process to be monitored has been executed, and
wherein the bus mechanism stores, when an interruption processing regarding another new process to be monitored has occurred in the first processor element while the first processor element is executing the process to be monitored, bus access information regarding the interruption processing in an area different from the area corresponding to the process to be monitored before the occurrence of the interruption processing.

9. The multiprocessor system according to claim 1, further comprising an error processing unit that executes a predetermined error processing when a result of the comparison by the comparison circuit indicates that said former and latter bus access information do not coincide with each other.

10. The multiprocessor system according to claim 1, wherein one of the first processor element and the second processor element separately runs in a spare tine which another one of the first processor element and the second processor element does not run.

11. The multiprocessor system according to claim 1, wherein the first processor element and the second processor element run independent of each other.

12. The multiprocessor system according to claim 1, wherein the storage unit memorizes the bus access information when the first processor element carries out the process to be monitored including a watch target process.

13. The multiprocessor system according to claim 12, wherein the controller requests the execution of the monitoring process, which includes a watch process, to the second processor element after a completion of an execution of the watch target process by the first processor element.

14. The multiprocessor system according to claim 13, wherein the second processor element carries out the watch process in the idle time.

15. A vehicle control system comprising:
a first motor mounted on a vehicle;
a first processor element configured to generate a control signal for the first motor;
a second motor mounted on the vehicle;
a second processor element configured to generate a control signal for the second motor;
a circuit accessed by the first processor element; and
a bus mechanism provided on an access path between the first processor element and the circuit,
wherein the bus mechanism comprises:
a storage unit configured to store bus access information regarding access to the circuit that occurs when the first processor element has executed a process to be monitored;
a controller configured to request the second processor element to execute a monitoring process whose processing content is the same as that of the process to be monitored after the first processor element has completed the execution of the process to be monitored; and
a comparison circuit configured to compare bus access information regarding access of the first processor element stored in the storage unit with bus access information input from the second processor element when the second processor element has executed the monitoring process, and
wherein the second processor element executes the monitoring process in an idle time.

16. The vehicle control system according to claim 15, wherein the first processor element and the second processor element periodically execute a signal generating process for generating the control signal and the monitoring process,
wherein the process to be monitored include the signal generating process executed by the first processor element, and
wherein the idle time includes a time zone during which the signal generating process is not executed in a period during which the signal generating process and the monitoring process are executed.

17. The vehicle control system according to claim 15, wherein one of the first processor element and the second processor element separately runs in a spare time which another one of the first processor element and the second processor element does not run.

18. The vehicle control system according to claim 15, wherein the storage unit memorizes the bus access information when the first processor element carries out the process to be monitored including a watch target process.

19. The vehicle control system according to claim 18, wherein the controller requests the execution of the monitoring process, which includes a watch process, to the second processor element after a completion of an execution of the watch target process by the first processor element.

20. The vehicle control system according to claim 19, wherein the second processor element carries out the watch process in the idle time.

* * * * *